United States Patent
Balamurugan et al.

(10) Patent No.: US 10,135,999 B2
(45) Date of Patent: Nov. 20, 2018

(54) METHOD AND SYSTEM FOR DIGITIZATION OF DOCUMENT

(71) Applicant: Conduent Business Services, LLC, Dallas, TX (US)

(72) Inventors: Chithralekha Balamurugan, Pondicherry (IN); Meera Sampath, Rochester, NY (US); Rebecca Taylor, Tyner, KY (US); Leslie Stone, Lexington, KY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 98 days.

(21) Appl. No.: 15/296,131

(22) Filed: Oct. 18, 2016

(65) Prior Publication Data

US 2018/0109685 A1 Apr. 19, 2018

(51) Int. Cl.
- H04N 1/00 (2006.01)
- G06K 9/00 (2006.01)
- G06T 7/00 (2017.01)
- G06K 9/18 (2006.01)

(52) U.S. Cl.
CPC ..... *H04N 1/00018* (2013.01); *G06K 9/00429* (2013.01); *G06K 9/00456* (2013.01); *G06K 9/18* (2013.01); *G06T 7/0081* (2013.01); *H04N 1/00039* (2013.01)

(58) Field of Classification Search
USPC ......... 1/1; 209/546; 382/115, 182; 705/7.13, 705/7.14; 713/176; 715/256; 726/22
See application file for complete search history.

(56) References Cited

U.S. PATENT DOCUMENTS

| | | | | |
|---|---|---|---|---|
| 5,697,504 | A * | 12/1997 | Hiramatsu | B07C 3/20 209/546 |
| 8,254,681 | B1 * | 8/2012 | Poncin | G06F 17/27 382/173 |
| 8,867,838 | B2 | 10/2014 | Balamurugan et al. | |
| 9,152,919 | B2 * | 10/2015 | Dasgupta | G06N 99/00 |
| 9,208,550 | B2 * | 12/2015 | Chen | H04N 5/23212 |
| 2004/0010758 | A1 * | 1/2004 | Sarkar | G06K 9/03 715/256 |
| 2004/0117627 | A1 * | 6/2004 | Brewington | H04N 1/32133 713/176 |
| 2009/0260080 | A1 * | 10/2009 | Yami | G06F 21/554 726/22 |
| 2014/0358605 | A1 | 12/2014 | Balamurugan et al. | |
| 2014/0359418 | A1 | 12/2014 | Balamurugan et al. | |
| 2015/0278747 | A1 | 10/2015 | Karanam et al. | |

(Continued)

*Primary Examiner* — Xuemei Chen
(74) *Attorney, Agent, or Firm* — Jones Robb, PLLC

(57) ABSTRACT

A method and a system for digitization of a document are disclosed. The document is scanned to generate an electronic document. One or more characters in a first set of portions of the electronic document are identified, based on a character recognition technique. Each portion in the first set of portions is classified in one or more groups based on at least a status of identification of the corresponding one or more characters. Further, one or more tasks are created for each of the one or more groups. The one or more tasks are transmitted to one or more crowdworkers, based at least on the respective type of the one or more tasks. Further, a response for each of the one or more tasks is received. Based on the received response, a digitized document is generated.

18 Claims, 9 Drawing Sheets

(56) References Cited

U.S. PATENT DOCUMENTS

| | | | |
|---|---|---|---|
| 2016/0034775 A1* | 2/2016 | Meadow | H04N 5/232 |
| | | | 382/182 |
| 2016/0071048 A1* | 3/2016 | Gujar | G06Q 10/063112 |
| | | | 705/7.14 |
| 2016/0104041 A1* | 4/2016 | Bowers | G06K 9/00483 |
| | | | 382/115 |
| 2016/0379315 A1* | 12/2016 | Balamurugan | G06Q 50/01 |
| | | | 705/7.13 |
| 2017/0039505 A1* | 2/2017 | Prabhakara | G06Q 10/063118 |
| 2017/0076241 A1* | 3/2017 | Kunde | G06Q 10/063112 |
| 2017/0308517 A1* | 10/2017 | Josifovski | G06F 17/30699 |

* cited by examiner

METHOD AND SYSTEM FOR DIGITIZATION OF DOCUMENT

TECHNICAL FIELD

The presently disclosed embodiments are related, in general, to digitization. More particularly, the presently disclosed embodiments are related to method and system for cost-effective digitization of a document.

BACKGROUND

With emergence of digital technologies and image processing techniques, organizations prefer to maintain documents in digital format for improved management of space and resources. Typically, the organizations have a large volume of documents, such as business process form images, insurance forms, client bills, and the like. Such documents may be digitized by using a shared service platform. Various examples of the shared service platform may include, but are not limited to, IT service platform, a crowdsourcing platform, and the like.

Generally, the organizations utilize the crowdsourcing platform for the digitization of the documents in such a manner that privacy is preserved and quality is assured. The digitization task is allocated to crowdworkers associated with the crowdsourcing platform. Before allocating the digitization task to crowdworkers, the documents are transformed into one or more digitization tasks. In certain scenarios, to assure quality of the digitization task, the one or more digitization tasks undergo repetitive executions, i.e., the digitization task performed by one crowdworker is verified by another crowdworker, and so on. Since, each of the one or more digitization tasks incurs crowdworker's payment and crowdsourcing platform commission for every execution of the one or more digitization tasks. Hence, it is desirable to execute the digitization task in a cost-effective manner.

Further limitations and disadvantages of conventional and traditional approaches will become apparent to a person having ordinary skill in the art, through a comparison of the described systems with some aspects of the present disclosure, as set forth in the remainder of the present application and with reference to the drawings.

SUMMARY

According to embodiments illustrated herein, there is provided a method for digitization of a document, the method includes scanning the document to generate an electronic document. The method further includes identifying one or more characters in a first set of portions of the electronic document based on a character recognition technique. The method further includes classifying each portion in the first set of portions in one or more groups based on at least a status of identification of the corresponding one or more characters. The method further includes creating one or more tasks for each of the one or more groups. The type of the one or more tasks created for a group of the one or more groups is different from the type of the one or more tasks created for other group of the one or more groups. Each type of the one or more tasks is associated with a cost. The cost of one type of the one or more tasks is different from the cost of other type of the one or more tasks. The method further includes transmitting the one or more tasks to one or more crowdworkers based at least on the respective type of the one or more tasks. The method further includes receiving a response for each of the one or more tasks from each of the one or more crowdworkers. The method further includes generating a digitized electronic document based on the response received for each of the one or more tasks.

According to embodiments illustrated herein, there is provided a system for digitization of a document. The system include one or more processors, configured to scan the document to generate an electronic document. The one or more processors are further configured to identify one or more characters in a first set of portions of the electronic document based on a character recognition technique. The one or more processors are further configured to classify each portion in the first set of portions in one or more groups based on at least a status of identification of the corresponding one or more characters. The one or more processors are further configured to create one or more tasks for each of the one or more groups, The type of the one or more tasks created for a group of the one or more groups is different from the type of the one or more tasks created for other group of the one or more groups. Each type of the one or more tasks is associated with a cost. The cost of one type of the one or more tasks is different from the cost of other type of the one or more tasks. The one or more processors are further configured to transmit the one or more tasks to one or more crowdworkers based at least on the respective type of the one or more tasks. The one or more processors are further configured to receive a response for each of the one or more tasks from each of the one or more crowdworkers. The one or more processors are further configured to generate a digitized electronic document based on the response received for each of the one or more tasks.

According to embodiments illustrated herein, there is provided a non-transitory computer-readable storage medium having stored thereon, a set of computer-executable instructions for causing a computer comprising one or more processors, configured to perform step including scanning of the document to generate an electronic document. The one or more processors are further configured to perform step including identifying one or more characters in a first set of portions of the electronic document based on a character recognition technique. The one or more processors are further configured to perform step including classifying each portion in the first set of portions in one or more groups based on at least a status of identification of the corresponding one or more characters. The one or more processors are further configured to perform step including creating one or more tasks for each of the one or more groups. The type of the one or more tasks created for a group of the one or more groups is different from the type of the one or more tasks created for other group of the one or more groups. Each type of the one or more tasks is associated with a cost. The cost of one type of the one or more tasks is different from the cost of other type of the one or more tasks. The one or more processors are further configured to perform step including transmitting the one or more tasks to one or more crowdworkers based at least on the respective type of the one or more tasks. The one or more processors are further configured to perform step including receiving a response for each of the one or more tasks from the one or more crowdworkers. The one or more processors are further configured to perform step including generating a digitized electronic document based on the response received for each of the one or more tasks.

BRIEF DESCRIPTION OF DRAWINGS

The accompanying drawings illustrate various embodiments of systems, methods, and other aspects of the disclosure. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
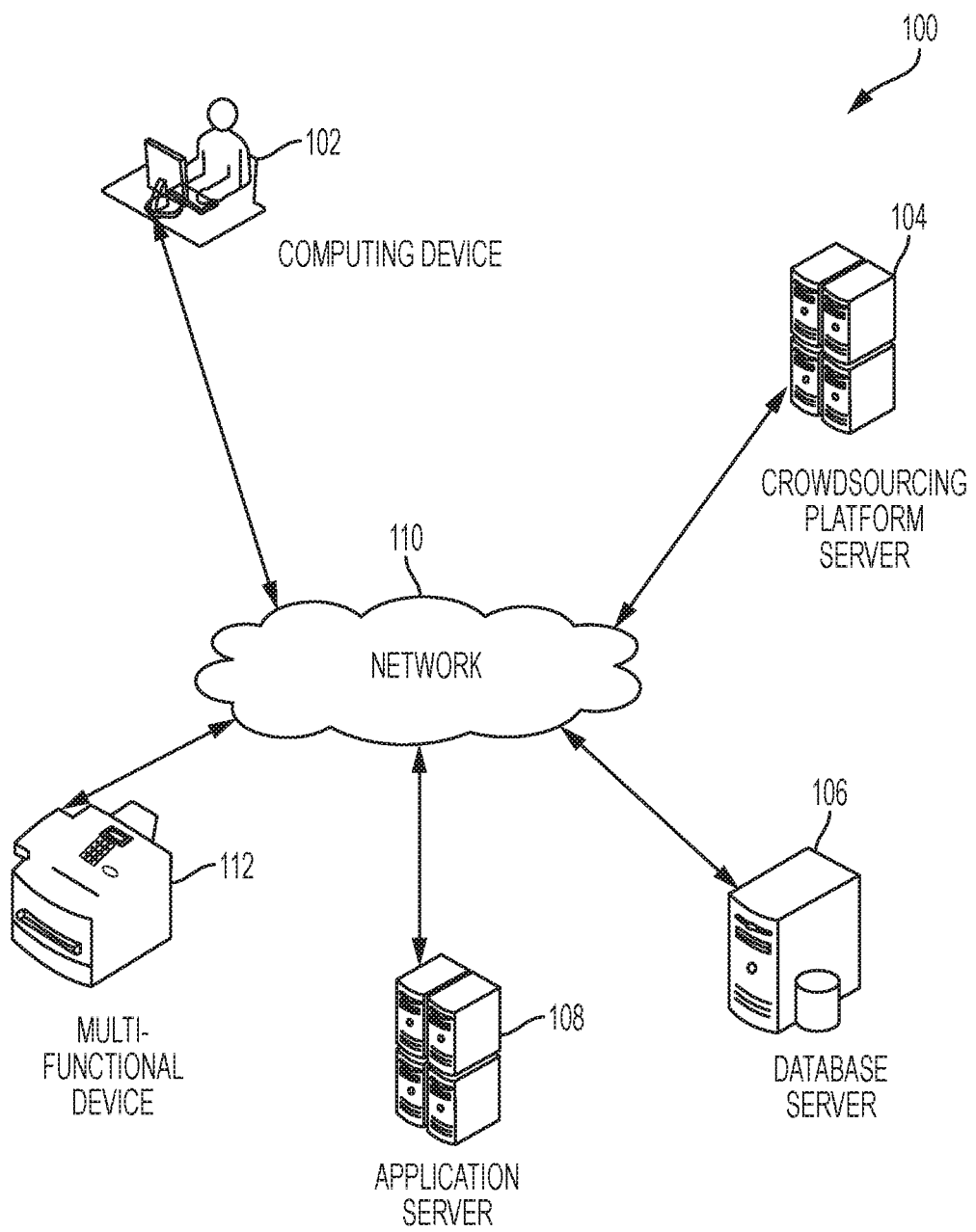
FIG. 1 is a block diagram that illustrates a system environment in which various embodiments of the system may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "an embodiment," "at least one embodiment," "one example," "an example," "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

An "electronic document" refers to information recorded in a manner that requires a computing device or other electronic device to display, interpret, and process it. The electronic document is intended to be used either in an electronic form or as printed output. The electronic document may include content, such as, a field, one or more characters, an image, a symbol, and/or the like. In an embodiment, the electronic document may be generated by scanning a document using a suitable scanner or a multi-functional device. The electronic document may be stored in a database server. In an embodiment, the electronic document may be associated with an identification code, such as "A," "B," "C," and the like. The electronic document may be stored in various file formats, such as, JPG or JPEG, GIF, TIFF, PNG, BMP, RAW, PSD, PSP, PDF, MS Word, MS Excel, and the like.

"Location identification code" refers to a position of a portion in an electronic document. For example, the location identification code may comprise Cartesian coordinates, such as, "x-y coordinates" of the portion in the electronic document. Further, the location identification code may be associated with an identification code of the electronic document. For example, for the electronic document with identification code "A," the location identification code of the portion may be "$(x_1, y_1)A$," "$(x_2, y_2)A$" and/or the like.

A "digitized electronic document" corresponds to a new electronic document that is generated based on a response received from each of one or more crowdworkers for each of one or more tasks. In an embodiment, the response corresponds to one or more characters that are received for respective one or more portions of the electronic document. After receiving the response, the one or more characters are stored in a modified set of portions in a database server. Further, to generate the digitized electronic document, each portion of the modified set of portions may be extracted from the database server and arranged in accordance with their location identification code.

A "pre-defined template" may refer to a framework of an electronic document that may be defined by an organization. For example, an insurance company may create a form that include one or more fields, such as, "policy number," "name," "age," "address," "contact number," and the like of a policy holder. In an embodiment, the pre-defined template may be utilized as a reference, based on which a first set of electronic documents and a second set of electronic documents may be identified from a plurality of electronic documents.

"First set of electronic documents" refers to one or more documents that may be identified from a plurality of electronic documents, based on a pre-defined template. For example, the pre-defined template may be an insurance form that may include one or more fields, such as, "policy number," "name," "age," "address," "contact number," and the like of a policy holder. If an electronic document matches with the pre-defined template (i.e., include the one or more fields as defined in the pre-defined template), it will be identified as the first set of electronic documents. In an embodiment, the electronic document may be selected from the first set of electronic documents.

"Second set of electronic documents" refers to one or more documents that may be identified from a plurality of electronic documents, based on a pre-defined template. For example, the pre-defined template may be an insurance form that may include one or more fields, such as, "policy number," "name," "age," "address," "contact number," and the like of a policy holder. If an electronic document fails to match with the pre-defined template (i.e., fails to include the one or more fields as defined in the pre-defined template), it will be identified as the second set of electronic documents. In an embodiment. The second set of electronic documents may be discarded from the plurality of electronic documents.

A "portion" refers to a region within an electronic document that may comprise a content. The content may correspond to a field, one or more characters, an image, a symbol, and/or the like. In an embodiment, the portion may comprise a field, such as, "name," "address," "age," and/or the like. Further, the one or more portions may comprise one or more characters corresponding to a field that may be provided by a user. In an embodiment, the electronic document may be segmented into one or more portions using an image processing technique known in the art, such as, but not limited to, a connected component analysis, or a window-based image feature extraction analysis. Each of the one or more portions may be associated with a location identification code. For example, the electronic document associated with an identification code "A," may be segmented into three portions. Hence the location identification code associated with each of the three portions may be, "$(x_1, y_1)A$," "$(x_2, y_2)A$," "$(x_3, y_3)A$," and the like. In an embodiment, a first set of portions from the one or more portions may be selected.

A "quality score" refers to a value that may be assigned to one or more portions of an electronic document. In an embodiment, the quality score may be assigned based on a presence of pre-defined marking and a presence of content, in the one or more portions.

"Pre-defined marking" refers to a mark of stamp, a mark of signature, a watermark, and/or the like in one or more portions of an electronic document.

"First set of portions" refers to a group of portions, selected from one or more portions of an electronic document. In an embodiment, the first set of portions may be selected based on a quality score associated with each of the one or more portions. The quality score may be assigned to the one or more portions based on a presence of pre-defined marking in the one or more portions, and a presence of content in the one or more portions. For example, the pre-defined marking may be a marking of stamp in the one or more portions. In an embodiment, the first set of portions may include the content, and may have high quality score. In an embodiment, the first set of portions may not include the predefined marking.

"First group of portions" refers to a group of portions selected from a first set of portions of an electronic document. The first group comprises a second set of portions selected from the first set of portions, where content (e.g., one or more characters corresponding to a field) are completely identified by an optical character recognition (OCR) technique.

"Second group of portions" refers to a group of portions selected from a first set of portions of an electronic document. The second group comprises a third set of portions selected from the first set of portions where the content (i.e., one or more characters corresponding to a field) are partially identified by an OCR technique.

"Third group of portions" refers to a group of portions selected from a first set of portions of an electronic document. The third group comprises a fourth set of portions selected from the first set of portions where an identification of content (i.e. one or more characters corresponding to a field) by an OCR technique has failed.

A "task" refers to a piece of work, an activity, an action, a job, an instruction, or an assignment to be performed. Tasks may necessitate the involvement of one or more workers. Examples of tasks include, but are not limited to, digitization of a document, generation of a report, evaluation of a document, extraction of data, and the like. In an embodiment, one or more tasks may be created for digitization of a document. Hereinafter, the "digitization task" and "task" may be interchangeably used.

"First type of task" corresponds to a data validation task. In an embodiment, the first type of task includes a second set of portions. The second set of portions may include one or more characters corresponding to one or more fields that need to be digitized by one or more crowdworkers. In an embodiment, to digitize the data validation task, the one or more crowdworkers may be asked to validate whether the one or more characters in the second set of portions matches with one or more characters identified based on an OCR technique. In the data validation task, crowdworkers may provide their responses in "yes" or "no." Therefore, in performing the data validation task, the crowdworkers need to put in less effort compared with effort required for processing a second type of task and a third type of task. Hence, the cost of digitization of the first type of task is low.

"Second type of task" corresponds to a data editing task. In an embodiment, the second type of task includes a third set of portions. The third set of portions may include one or more characters corresponding to one or more fields that need to be digitized by one or more crowdworkers. In an embodiment, to digitize the data editing task, the one or more crowdworkers may be asked to edit the one or more characters in the third set of portions, as the one or more characters in the third set of portions are partially identified by the OCR technique. In the data editing task, the crowdworkers may edit one or more characters in the third set of portions. Therefore, while performing the data editing task, the crowdworkers need to put in more effort compared with a data validation task. Hence, the cost of digitization of the second type of task is higher compared with the first type of task.

"Third type of task" corresponds to a data entry task. In an embodiment, the second type of task include a fourth set of portions. The fourth set of portions may include one or more characters corresponding to one or more fields that need to be digitized by one or more crowdworkers. In an embodiment, to digitize the data entry task, the one or more crowdworkers may be asked to input one or more characters in the fourth set of portions. As discussed, the identification of the one or more characters in the fourth set of portions had failed by the OCR technique. Therefore, the crowdworkers may be asked to input the one or more characters in the fourth set of portions. Therefore, while performing the data entry task, the crowdworkers need to put in more effort compared with a data editing task. Hence, the cost of digitization of the third type of task is higher as compared with the second type of task.

"One or more crowdworkers" refer to one or more workers or a loosely defined groups of individual remote workers who may execute one or more tasks that generate data, contributing to a defined result, such as a data validation task, a data entry task, or a data editing task. Example of the one or more crowdworkers may include, but are not limited to, a satellite center employee, a rural business process outsourcing (BPO) firm employee, a home-based employee, or an Internet-based employee.

"Crowdsourcing" refers to distribution of one or more tasks by soliciting participation of one or more crowdworkers. The one or more crowdworkers may include, for example, individuals responding to the one or more tasks published on a certain website (e.g. a crowdsourcing platform), such as Amazon Mechanical Turk® or Crowd Flower®.

A "crowdsourcing platform" refers to a business application, wherein a broad, loosely defined external group of people, a community, or an organization, provides solutions as an output for any specific business processes received by the application as an input. In an embodiment, the crowdsourcing platform may be hosted online on a web portal (e.g., a crowdsourcing platform server). In an embodiment, the crowdsourcing platform may receive one or more tasks as the input, and provide solution as the output. Various examples of the crowdsourcing platform may include, but are not limited to, Amazon Mechanical Turk® or Crowd Flower®.

FIG. 1 is a block diagram that illustrates a system environment 100 in which various embodiments of a method and a system may be implemented. The system environment 100 includes a computing device 102, a crowdsourcing platform server 104, a database server 106, an application server 108, a network 110, and a multi-functional device 112. Various devices in the system environment 100 may be interconnected over the network 110. FIG. 1 shows, for simplicity, one computing device 102, one crowdsourcing platform server 104, one database server 106, one application server 108, and one multi-functional device 112. However, it will be apparent to a person having ordinary skills in the art that the disclosed embodiments may also be implemented using multiple computing devices, multiple crowdsourcing platform servers, multiple database servers, multiple application servers, and multiple multi-functional devices without departing from the scope of the disclosure.

The computing device 102 may comprise one or more processors in communication with one or more memories. The one or more memories may include one or more computer-readable codes, instructions, programs, or algorithms that are executable by the one or more processors to perform one or more predetermined operations. The computing device 102 may communicate with the crowdsourcing platform server 104 and the application server 108 through the network 110 (e.g., using wired or wireless communication capabilities). The computing device 102 may receive one or more tasks from the crowdsourcing platform hosted by the crowdsourcing platform server 104. In an embodiment, the computing device 102 may be associated with one or more crowdworkers to execute the one or more tasks. Examples of the computing device 102 may include, but are not limited to, a desktop computer, a laptop, a personal digital assistant (PDA), a mobile device, a smartphone, a tablet computer (e.g., iPad® and Samsung Galaxy Tab®), and/or the like.

The crowdsourcing platform server 104 are devices or computers that host a crowdsourcing platform and may be interconnected to the computing device 102 associated with the one or more crowdworkers, the database server 106, and the application server 108, over the network 110. In an embodiment, the crowdsourcing platform server 104 may be configured to online host the crowdsourcing platform. The crowdsourcing platform may publish the one or more tasks received from the application server 108. Further, the one or more crowdworkers may provide a response for the one or more tasks, to the application server 108, through the crowdsourcing platform. Examples of the crowdsourcing platform may include, but are not limited to, Amazon Mechanical Turk® or Crowd Flower®.

The database server 106 may refer to a device or a computer that maintains a repository of a plurality of electronic documents, received from the multi-functional device 112, over the network 110. In an embodiment, the database server 106 may receive the plurality of electronic documents from the application server 108. The database server 106 may receive a query from the application server 108 to retrieve the plurality of electronic documents, if the plurality of electronic documents are received from the multi-functional device 112. In an embodiment, the database server 106 may store the response provided by each the one or more crowdworkers for each of the one or more tasks. For querying the database server 106, one or more querying languages may be utilized, such as, but are not limited to, SQL, QUEL, DMX and so forth. Further, the database server 106 may be realized through various technologies, such as, but are not limited to, Microsoft® SQL server, Oracle, and My SQL. In an embodiment, the application server 108 may connect to the database server 106 using one or more protocols, such as, but not limited to, ODBC protocol and JDBC protocol.

The application server 108 may comprise one or more processors in communication with one or more memories. The one or more memories may include one or more computer readable codes, instructions, programs, or algorithms that are executable by the one or more processors to perform one or more predetermined operations. The application server 108 may scan a document to generate an electronic document. In an embodiment, the application server 108 may scan a plurality of documents to generate a plurality of electronic documents. In an embodiment, the application server 108 may retrieve the plurality of electronic documents from the database server 106, when the plurality of electronic documents are generated based on scanning of the plurality of documents by the multi-functional device 112. Further, the application server 108 may identify a first set of electronic documents and a second set of electronic documents from the plurality of electronic documents, based on a pre-defined template. The first set of electronic documents correspond to a set of electronic documents that match with the pre-defined template. Hence, the first set of electronic documents may be selected for the further processing. The second set of electronic documents correspond to a set of electronic documents that fails to match with the pre-defined template. Hence, the second set of electronic documents may be discarded from further processing.

In an embodiment, the application server 108 may further identify the electronic document as the first set of electronic documents. In an embodiment, the application server 108 may select the electronic document from the first set of electronic documents. The application server 108 may segment the electronic document into one or more portions. Further, the application server 108 may select a first set of portions from the one or more portions based on a quality score associated with each of the one or more portions. In an embodiment, the first set of portions may include the content. In an embodiment, the content may correspond to the one or more characters (corresponding to a field) written in each portion of the first set of portions. For the purpose of the ongoing description, the content has been considered as the one or more characters corresponding to the field of the respective portion.

In an embodiments, the application server 108 may identify one or more characters in the first set of portions of the electronic document, based on a character recognition technique. Further, the application server 108 may classify each portion in the first set of portions, in one or more groups based on at least a status of identification of the one or more characters. The application server 108 may further create one or more tasks for each of the one or more groups. The type of the one or more tasks created for a group of the one or more groups is different from the type of the one or more tasks created for other group of the one or more groups. The application server 108 may further transmit the one or more tasks to the one or more crowdworkers based at least on the respective type of the one or more tasks. The application server 108 may further receive a response for each of the one or more tasks, from the one or more crowdworkers. Based on the response received for each of the one or more tasks, the application server 108 may generate a digitized electronic document. Examples of the application server 108 may include, but not limited to, a relational database server, a SAP® server, a PeopleSoft® server, a Siebel® server, and the like.

The network 110 may include a medium through which devices, such as the computing device 102, the crowdsourcing platform server 104, the database server 106, the application server 108, and the multi-functional device 112 may communicate with each other. Examples of the network 110 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

The multi-functional device 112 refers to a machine that may be capable to perform various functions, such as scan, copy, print, email, fax, and the like, of a document that is provided as an input. In an embodiment, the multi-functional device 112 may scan a plurality of documents to generate the plurality of electronic documents. The plurality of electronic documents may be transmitted to the database server 106 over the network 110. Examples of the multi-functional device 112 may include, but are not limited to, a multi-functional printer and/or a multi-functional peripheral.

Figure 2:
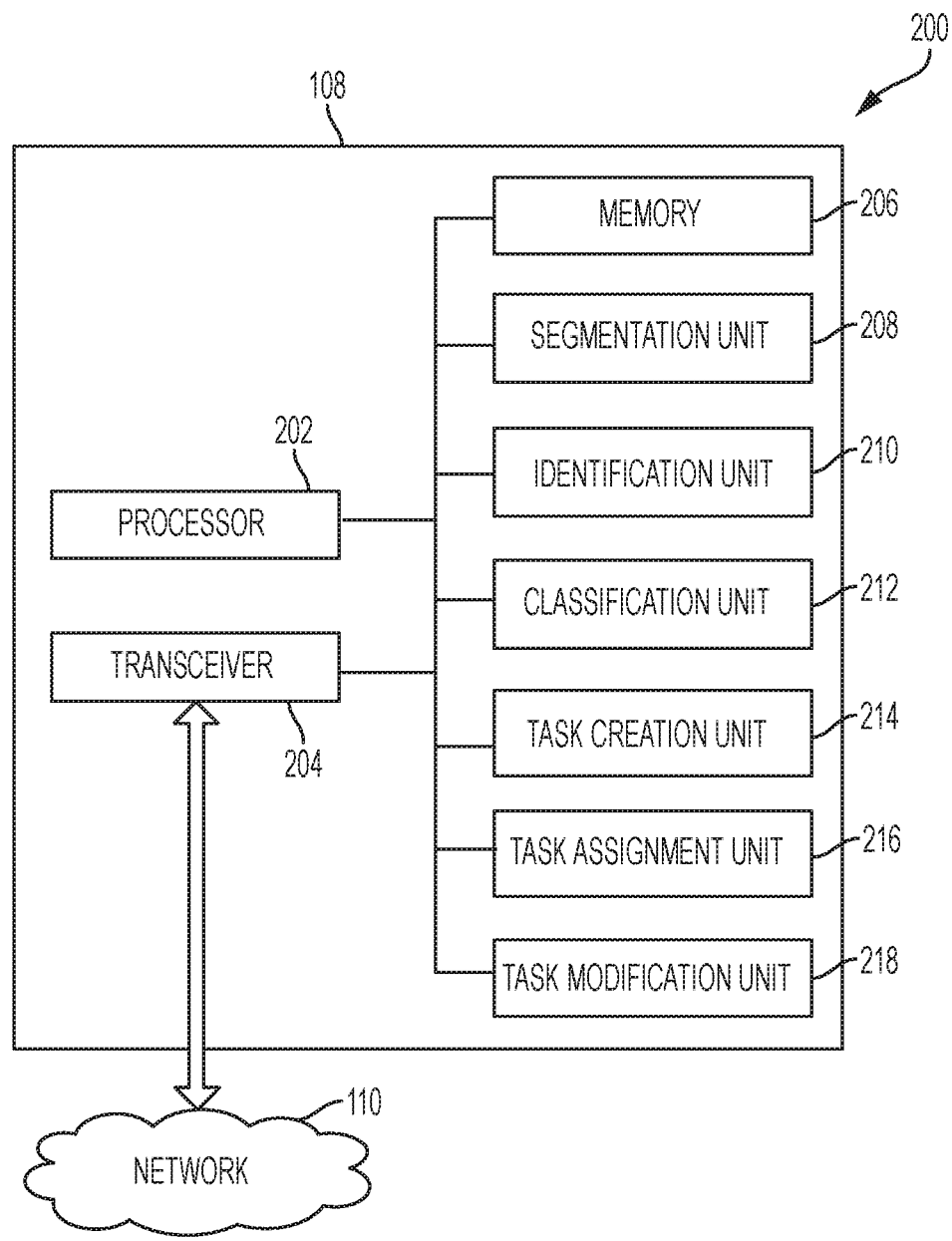
FIG. 2 is a block diagram that illustrates various components of an application server, in accordance with at least one embodiment.

FIG. 2 is a block diagram 200 that illustrates various components of the application server 108, in accordance with at least one embodiment. FIG. 2 is explained in conjunction with the FIG. 1. The application server 108 may include one or more processors, such as a processor 202, one or more transceivers, such as a transceiver 204, one or more memories, such as a memory 206, one or more segmentation units, such as a segmentation unit 208, one or more identification units, such as an identification unit 210, one or more classification units, such as a classification unit 212, one or more task creation units, such as a task creation unit 214, one or more task assignment units, such as a task assignment unit 216, and one or more task modification units, such as a task modification unit 218. A person with ordinary skills in the art will appreciate that the scope of the disclosure is not limited to the components as described herein.

The processor 202 may comprise of suitable logic, circuitry, interface, and/or code that may be configured to execute one or more sets of instructions stored in the memory 206. The processor 202 may be communicatively coupled to the transceiver 204, the memory 206, the segmentation unit 208, the identification unit 210, the classification unit 212, the task creation unit 214, the task assignment unit 216, and the task modification unit 218. The processor 202 may execute the one or more sets of instructions, programs, codes, and/or scripts stored in the memory 206 to perform the one or more predetermined operations. For example, the processor 202 may work in coordination with the transceiver 204, the memory 206, the segmentation unit 208, the identification unit 210, the classification unit 212, the task creation unit 214, the task assignment unit 216, and the task modification unit 218, to generate the digitized electronic document. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The transceiver 204 may comprise of suitable logic, circuitry, interface, and/or code that may be configured to communicate with one or more computing devices, such as the computing device 102, one or more crowdsourcing platform servers, such as the crowdsourcing platform server 104, one or more database servers, such as the database server 106, and one or more multi-functional devices, such as the multi-functional device 112, over the network 110. The transceiver 204 may be configured to transmit or receive the one or more sets of instructions, queries, and/or other information to/from various components of the system environment 100. The transceiver 204 may implement one or more known technologies to support wired or wireless communication with the network 110. In an embodiment, the transceiver 204 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 204 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The memory 206 may comprise of suitable logic, circuitry, and/or interfaces that may be configured to store one or more machine codes, and/or computer programs having at least one code section executable by the processor 202. The memory 206 may be further configured to store the one or more sets of instructions, codes, and/or scripts. In an embodiment, the memory 206 may be configured to store the one or more tasks to be transmitted to the one or more crowdworkers. In an embodiment, the memory 206 may be configured to store the digitized electronic document. Some of the commonly known memory implementations include, but are not limited to, a random access memory (RAM), a read only memory (ROM), a hard disk drive (HDD), and a secure digital (SD) card. It will be apparent to a person having ordinary skills in the art that the one or more sets of instructions, programs, codes, and/or scripts stored in the memory 206 may enable the hardware of the application server 108 to perform the one or more predetermined operations.

The segmentation unit 208 may comprise suitable logic, circuitry, and/or interfaces that may be configured to segment the electronic document of the first set of electronic documents into the one or more portions. In an embodiment, each of the one or more portions may be associated with a location identification code. In an embodiment, the segmentation unit 208 may be further configured to assign a quality score to each of the one or more portions based on a presence of pre-defined marking, and a presence of content. The segmentation unit 208 may be configure to select the first set of portions from the one or more portions based on at least the quality score. In an embodiment, the segmentation unit 208 may be implemented as an Application-Specific Integrated Circuit (ASIC) microchip designed for a special application, such as to segment the electronic document into the one or more portions.

The identification unit 210 may comprise suitable logic, circuitry, and/or interfaces that may be configured to identify the first set of electronic documents and the second set of electronic documents from the plurality of electronic documents, based on the pre-defined template. In an embodiment, the identification unit 210 may be configured to identify an electronic document as the first set of electronic document. The identification unit 210 may further be configured to identify the one or more characters in the first set of portions of the electronic document based on a character recognition technique. The character recognition technique may include, but are not limited to, an optical character recognition (OCR) technique, an intelligent character recognition (ICR) technique, and/or an optical mark recognition (OMR) technique. In an embodiment, the identification unit 210 may be implemented as an Application-Specific Integrated Circuit (ASIC) microchip designed for a special application, such as to identify the one or more characters in the first set of portions of the electronic document.

The classification unit 212 may comprise suitable logic, circuitry, and/or interfaces that may be configured to classify each portion of the first set of portions in the one or more groups based on at least a status of identification of the one or more characters. In an embodiment, the status of identification of the one or more characters comprise a complete identification of the one or more characters, a partial identification of the one or more characters, a failed identification of the one or more characters, in each portion in the first set of portions. In an embodiment, the one or more groups comprise a first group, a second group, and a third group. In an embodiment, the classification unit 212 may be implemented as an Application-Specific Integrated Circuit (ASIC) microchip designed for a special application, such as to classify each portion of the first set of portions in the one or more groups.

The task creation unit 214 may comprise suitable logic, circuitry, and/or interfaces that may be configured to create one or more tasks for each of the one or more groups. In an embodiment, a type of the one or more tasks created for a group of the one or more groups is different from the type of the one or more tasks created for other group in the one or more groups. In an embodiment, each type of the one or more tasks is associated with a cost. The cost of one type of a task is different from the cost of other type of task in the one or more tasks. In an embodiment, the one or more tasks created for the first group correspond to a first type of task, the one or more tasks created for the second group correspond to a second type of task, and the one or more tasks created for the third group correspond to a third type of task. In an embodiment, the first type of task corresponds to a data validation task, the second type of task corresponds to a data editing task, and the third type of task corresponds to a data entry task. In an embodiment, the task creation unit 214 may be implemented as an Application-Specific Integrated Circuit (ASIC) microchip designed for a special application, such as to create the one or more tasks for each of the one or more groups.

The task assignment unit 216 may comprise suitable logic, circuitry, and/or interfaces that may be configured to transmit the one or more tasks to the one or more crowdworkers based at least on the respective type of the one or more tasks. In an embodiment, the task assignment unit 216 may be configured to transmit the one or more tasks to the one or more crowdworkers through the crowdsourcing platform. Each of the one or more crowdworkers may provide a response for each of the one or more tasks. In an embodiment, the task assignment unit 216 may be implemented as an Application-Specific Integrated Circuit (ASIC) microchip designed for a special application, such as to transmit the one or more tasks to the one or more crowdworkers.

The task modification unit 218 may comprise suitable logic, circuitry, and/or interfaces that may be configured to modify the type of the one or more tasks based on a response received from each of the one or more crowdworkers. For example, the task modification unit 218 may be configured to modify the data validation task into the data entry task based on the response received from each of the one or more crowdworkers for the data validation task. Similarly, the type of the data editing task and the data entry task may be modified into the data validation task by the task modification unit 218.

Figure 3:
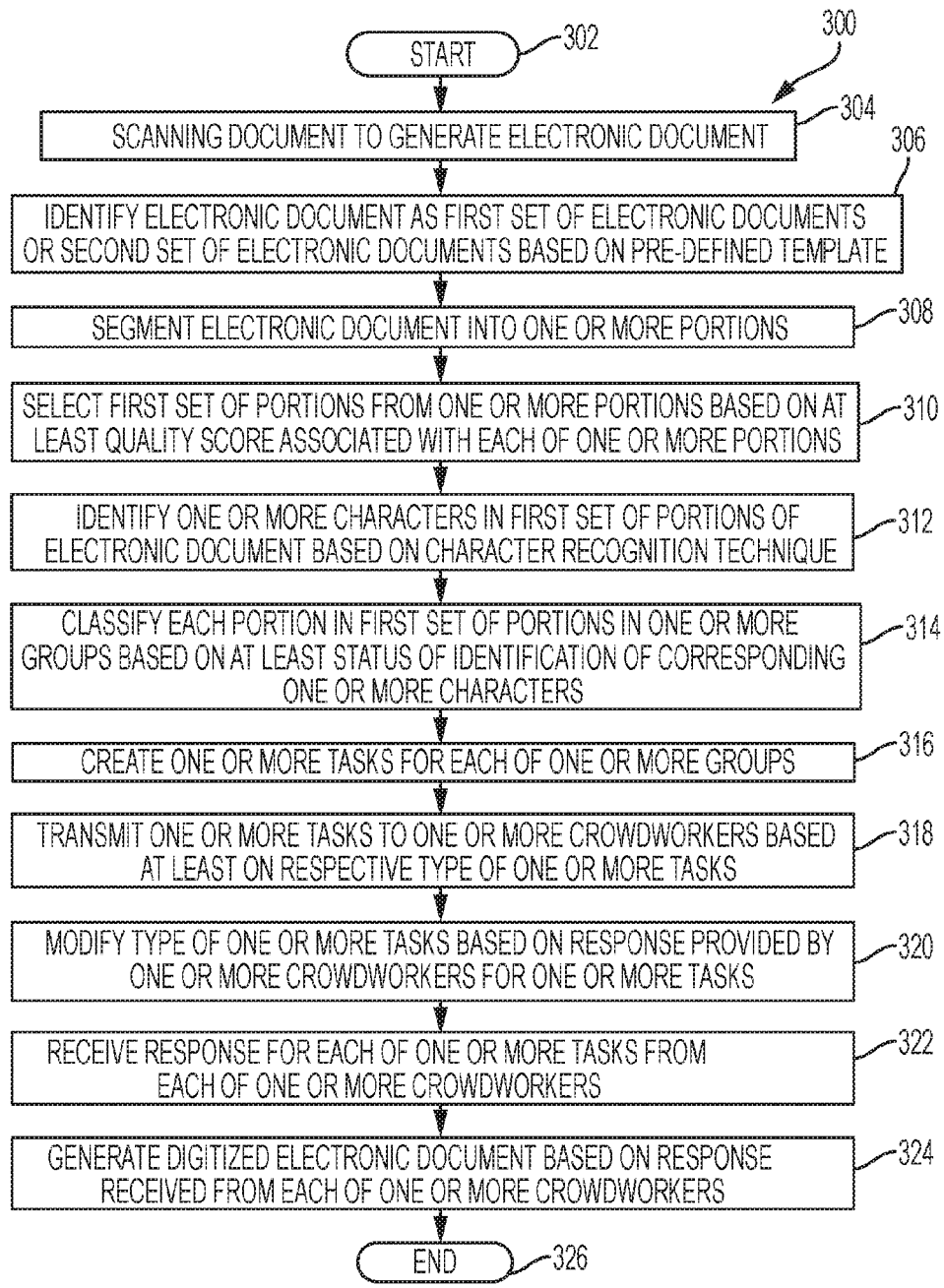
FIG. 3 is a flowchart that illustrates a method for digitization of a document, in accordance with at least one embodiment.

FIG. 3 illustrates a flowchart 300 of a method for digitization of the document, in accordance with at least one embodiment. The flowchart 300 is described in conjunction with FIGS. 1-2. The method starts at step 302 and proceeds to step 304.

At step 304, the document may be scanned to generate the electronic document. The processor 202 may be configured to scan the document to generate the electronic document. In an embodiment, the processor 202 may be configured to scan a plurality of documents to generate a plurality of electronic documents. In an embodiment, the processor 202 may be configured to retrieve the plurality of electronic documents from the database server 106 through the transceiver 204, if the plurality of electronic documents are generated by the multi-functional device 112. The plurality of documents may be either printed documents or handwritten documents. Example of the plurality of documents may include, but are not limited to, a business process form image, an insurance form, a client bill, a medical bill, and the like. In an embodiment, the plurality of documents may be scanned using the multi-functional device 112 to generate the plurality of electronic documents. The plurality electronic documents may be stored in various file formats, such as, JPG or JPEG, GIF, TIFF, PNG, BMP, RAW, PSD, PSP, PDF, MS Word, MS Excel, and the like. In an embodiment, each of the plurality of electronic documents may be associated with the identification code, such as "A," "B," "C," and the like. In an embodiment, the plurality of electronic documents may be stored in the database server 106 along with their respective identification code.

At step 306, the identification unit 210 may be configured to identify the first set of electronic documents and the second set of electronic documents, from the plurality of electronic documents. The first set of electronic documents and the second set of electronic documents may be identified based on the pre-defined template. The pre-defined template may correspond to a framework of an electronic document that may be defined by an organization. For example, an insurance company may create a form that include one or more fields, such as, "policy number," "name," "age," "address," "contact number," and the like of a policy holder. In an embodiment, the pre-defined template may be utilized as a reference, based on which the first set of electronic documents and the second set of electronic documents may be identified from the plurality of electronic documents. In an embodiment, the identification unit 210 may be configured to compare the plurality of electronic documents with the pre-defined template. Based on the comparison, the first set of electronic documents and the second set of electronic documents may be identified by the identification unit 210. The identification unit 210 may further be configured to identify the first set of electronic documents, as the first set of electronic documents match with the pre-defined template (i.e., include the one or more fields as defined in the pre-defined template). In an embodiment, the first set of electronic documents may be processed for digitization. Further, the identification unit 210 may discard the second set of electronic documents, as the second set of electronic documents fails to match with the pre-defined template (i.e., fails to include the one or more fields as defined in the pre-defined template). Therefore, the cost of digitization of the second set of electronic documents may be saved.

In an embodiment, the identification unit 210 may further be configured to identify the electronic document as the first set of electronic documents based on the pre-defined template. In an embodiment, the processor 202 may be configured to select the electronic document from the first set of electronic documents. In an embodiment, the processor 202 may assign an identification code to each of the plurality of electronic documents. For example, the electronic document may be associated with the identification code "A."

A person with ordinary skills in the art will understand that for brevity, the method for digitization of the document is hereinafter explained with respect to one electronic document only. Notwithstanding, the disclosure may not be so limited, and the method may be further implemented for the first set of electronic documents, without deviation from the scope of the disclosure.

At step 308, the electronic document of the first set of electronic documents may be segmented into one or more portions. In an embodiment, the segmentation unit 208 may be configured to segment the electronic document into the one or more portions. Each of the one or more portions may be associated with the location identification code. For example, if the electronic document "A" is segmented into two portions, the location identification code associated with each of the two portions may be "$(x_1, y_1)A$ to $(x_2, y_2)A$." Further, at step 310, a first set of portions from the one or more portions may be selected based on the quality score associated with each of the one or more portions. In an embodiment, the segmentation unit 208 may be configured to assign the quality score to each of the one or more portions based on the presence of pre-defined marking, and the presence of content. Examples of pre-defined marking may include, but are not limited to, a mark of stamp, a mark of signature, a watermark, and the like. In an embodiment, the segmentation unit 208 may be configured to compare the quality score associated with each of the one of the one or more portions with a first pre-defined threshold score. In an embodiment, the portions that have a quality score greater than the first pre-defined threshold score are considered as high quality portions and are further selected as the first set of portions. Further, the portions that have a quality score less than the first pre-defined threshold score are considered as low quality portions and are selected as other set of portions.

As discussed above that the quality score assigned to the one or more portions is dependent on the presence of the content in the respective one or more portions. Therefore, a low quality score is assigned to the portions of the one or more portions that do not have the content. Henceforth, the first set of portions include the portions that comprise the content. In an embodiment, the low quality portions in the other set of portions may be discarded. Therefore, the cost of digitization of the other set of portions is saved.

At step 312, the one or more characters in the first set of portions of the electronic document may be identified, based on the character recognition technique. In an embodiment, the identification unit 210 may be configured to identify the one or more characters in the first set of portions, based on the character recognition technique. Example of the character recognition technique may include, but is not limited to, an optical character recognition (OCR) technique, an intelligent character recognition (ICR) technique, and/or optical mark recognition (OMR) technique. In an embodiment, the identification unit 210 may utilize the OCR technique to identify the one or more characters in each portion of the first set of portions. In an embodiment, the identification unit 210 may further determine the status of the identification of the one or more characters. A person having ordinary skills in the art would understand that the process of the character identification in not accurate in certain scenarios. For example, certain character of the one or more characters may be misinterpreted. For instant the character "o" may be misinterpreted as numeral "0." In an embodiment, the identification unit 210 may be configured to determine a confidence score for the one or more identified characters using known techniques in the prior art. A person having ordinary skills in the art will appreciate that the character recognition techniques usually determine the confidence score for each of the one or more identified characters during the identification process.

In an embodiment, the identification unit 210 may be configured to compare the confidence score associated with a second pre-defined threshold score. In an embodiment, if the confidence score of a character is greater than the second pre-defined threshold score, the identification unit 210 may consider the identified character as correct character. Similarly, the identification unit 210 may be configured to determine whether the other one or more characters have been correctly identified. In an embodiment, the identification unit 210 may be further configured to determine a count of characters of the one or more characters that have been correctly identified. In an embodiment, the identification unit 210 may compare the count of the correctly identified character with a third pre-defined threshold score. In an embodiment, if all the characters of the one or more characters have been correctly identified, the identification unit 210 may mark the portion (from which the one or more characters have been identified) as complete identification. In an embodiment, if the count of characters exceed the third pre-defined threshold score, the identification unit 210 may mark the portion partial identification. In an embodiment, if the count of characters is less than the third pre-defined threshold score, the identification unit 210 may mark the portion as failed identification.

In an embodiment, the identification unit 210 may identify a second set of portions from the first set of portions, where the one or more characters are completely identified based on the OCR technique. For example, the second set of portions may include the one or more fields, such as, "name," "address," "gender," "age," and the like. The one or more characters corresponding to the one or more fields are completely identified based on the OCR technique. Table 1 provided below illustrates the second set of portions.

TABLE 1

Illustration of the second set of portions
Second set of portions

| One or more fields | One or more characters |
|---|---|
| Name | abc |
| Address | South Avenue, NY |
| Gender | Male |
| Age | 45 years |

Further, the identification unit 210 may identify the third set of portions from the first set of portions, where the one or more characters are partially identified based on the OCR technique. For example, the third set of portions may include the one or more fields, such as, "name," "address," "gender," "age," and the like. The one or more characters corresponding to the one or more fields are partially identified. In partial identification, the name "abc" may be identified as "ab" or the age "45 years" may be identified as "45 yeas," and the like, by the OCR technique. Table 2 provided below illustrates the third set of portions.

TABLE 2

Illustration of the third set of portions
Third set of portions

| One or more fields | One or more characters |
|---|---|
| Name | ab |
| Address | South, NY |
| Gender | Mal |
| Age | 45 yeas |

Similarly, the identification unit 210 may identify a fourth set of portions from the first set of portions, where the identification of the one or more characters has failed based on the OCR technique. For example, the fourth set of portions may include the one or more fields, such as, "name," "address," "gender," "age," and the like. The one or more characters corresponding to the one or more fields are failed to be identified. In failed identification, name, address, gender, and age may not be identified based on the OCR technique. Table 3 provided below illustrates the fourth set of portions.

TABLE 3

Illustration of the fourth set of portions
Fourth set of portions

| One or more fields | One or more characters |
|---|---|
| Name | |
| Address | |

TABLE 3-continued

Illustration of the fourth set of portions
Fourth set of portions

| One or more fields | One or more characters |
|---|---|
| Gender | |
| Age | |

It will be apparent to a person having ordinary skills in the art that above Table 1, Table 2, and Table 3 has been provided only for illustration purposes and should not limit the scope of the invention to the one or more characters included in the second set of portions, third set of portions, and the fourth set of portions only. For example, listed one or more characters included in the second set of portions, the third set of portions, and the fourth set of portions included in the Table 1, Table 2, and Table 3, respectively, may be different from depicted one or more characters.

At step 314, based on at least a status of identification of the one or more characters, each portion in the first set of portions may be classified in one or more groups. In an embodiment, the classification unit 212 may be configured to classify each portion in the first set of portions in one or more groups, based on at least the status of identification of the corresponding one or more characters. The status of identification of the one or more characters comprise a complete identification of the one or more characters, a partial identification of the one or more characters, and a failed identification of the one or more characters. In an embodiment, the first set of portions comprises a second set of portions, including one or more characters that are completely identified based on the OCR technique. Further, the first set of portions comprises a third set of portions, including one or more characters that are partially identified based on the OCR technique. Further, the first set of portions comprises a fourth set of portions, including one or more characters that are failed to be identified based on the OCR technique. The classification unit 212 may further be configured to classify the second set of portions in a first group, the third set of portions in a second group, and the fourth set of portions in a third group. Table 4 provided below illustrates the classification of the one or more groups.

TABLE 4

Illustration of classification of the one or more groups

| Group | Portions |
|---|---|
| First group | Second set of portions |
| Second group | Third set of portions |
| Third group | Fourth set of portions |

At step 316, one or more tasks may be created for each of the one or more groups. In an embodiment, the task creation unit 214 may be configured to create the one or more tasks for each of the one or more groups. The type of the one or more tasks created for a group of the one or more groups may be different from the type of the one or more tasks created for other group of the one or more groups. In an embodiment, the one or more tasks created for the first group corresponds to a first type of task, the one or more tasks created for the second group corresponds to a second type of task, and the one or more tasks created for the third group corresponds to a third type of task.

In an embodiment, the first type of task may corresponds to a data validation task, the second type of task may corresponds to a data editing task, and the third type of task may corresponds to a data entry task. The first type of task (data validation task) may comprise content of the first group (i.e., second set of portions), which include the one or more characters that are completely identified based on the OCR technique. The second type of task (data editing task) may comprise content of the second group (i.e., third set of portions), which include the one or more characters that are partially identified based on the OCR technique. Further, the third type of task (data entry task) may comprise content of the third group (i.e., fourth set of portions), which include the one or more characters that are failed to be identified based on the OCR technique.

In an embodiment, the task creation unit 214 may be further configured to create the one or more tasks, in such a manner that each of the one or more tasks, include portion of a same field. For example, the first group include the second set of portions that include one or more fields, such as, "name," "address," "gender," and "age." The data validation task may be created such that it comprises portion of the "name" field extracted from the second set of portions. Similarly, another validation task is created that includes portion of the "age" field extracted from the second set of portions. The following Table 5 illustrates an example of the one or more tasks created for each of the one or more groups:

TABLE 5

Illustration of creation of the one or more tasks.

| | | Portions | |
|---|---|---|---|
| Task | Group | One or more fields | One or more characters |
| Data validation task | First group | Name | abc |
| | | Name | xyz |
| | | Name | uvw |
| Data editing task | Second group | Name | Bc |
| | | Name | Xy |
| | | Name | uv |
| Data entry task | Third group | Name | |
| | | Name | |
| | | Name | |

It will be apparent to a person having ordinary skills in the art that the above Table 5 has been provided only for illustration purposes and should not limit the scope of the invention to the one or more portions (i.e., "name" field) included in the data validation task, the data editing task, and the data entry task, only. For example, listed one or more portions (i.e., "name" field) included in the data validation task, the data editing task, and the data entry task, in Table 5, may be different from depicted one or more portions.

In an embodiment, each type of the one or more tasks may be associated with a cost. The cost of one type of the one or more tasks is different from the cost of other type of the one or more tasks. The cost of digitization of the first type of task is less compared with the cost of digitization of the second type of task, and the cost of digitization of the second type of task is less compared with the cost of digitization of the third type of task. For example, the cost of digitization of the data validation task is less compared with the cost of digitization of the data editing task, and the cost of digitization of the data editing task is less compared with the cost of digitization of the data entry task. In an embodiment, the instances of occurrence of the data entry task may be minimum, as a likelihood of failed identification of the one or more characters, in each portion in the first set of portions is minimum. Hence, the cost of digitization of the data entry task may be minimized.

At step 318, the one or more tasks may be transmitted to the one or more crowdworkers based at least on respective type of the one or more tasks. In an embodiment, the task assignment unit 216 may be configured to transmit the one or more tasks to the one or more crowdworkers, utilizing the crowdsourcing platform server 104. The one or more crowdworkers may be different from each other. For example, the data validation task may be transmitted to one crowdworker of the one or more crowdworkers. Similarly, the data entry task may be transmitted to another crowdworker of the one or more crowdworkers. The task assignment unit 216 may be configured to publish the one or more tasks at the crowdsourcing platform hosted on the crowdsourcing platform server 104. In an embodiment, the task assignment unit 216 may transmit the one or more tasks in accordance with a pre-defined workflow. Further, the one or more crowdworkers may execute the one or more tasks, received from the crowdsourcing platform and provide their responses for the respective task.

In an embodiment, the one or more tasks may be received by the computing device 102 associated with the one or more crowdworkers. Further, the one or more crowdworkers may use a user interface to execute the one or more tasks. Example of the user interface may be described later in conjunction with FIG. 7.

At step 320, the type of the one or more tasks may be modified, based on the response provided by the one or more crowdworkers for the one or more tasks. In an embodiment, to ensure quality of digitization of the one or more tasks, the one or more tasks executed by one crowdworker may be verified by another crowdworker. For example, if one crowdworker provide a response to the data entry task, another crowdworker may be asked to validate the response. Hence, the data entry task may be modified into the data validation task, based on the response provided by the one crowdworker. Similarly, the data validation task may be modified into the data entry task and the data editing task may be modified into the data validation task. Example workflow of the one or more tasks have been described later in conjunction with FIG. 4.

At step 322, a response for each of the one or more tasks is received from each of the one or more crowdworkers. In an embodiment, the transceiver 204 may be configured to receive the response for each of the one or more tasks from each of the one or more crowdworkers. The response received for one type of task may be different from the response received for other type of the task. For example, the response for data validation task may be received in the form of "yes" or "no." After receiving the response as "yes," the one or more characters that are completely identified by OCR technique are retained in the second set of portions. Further, the second set of portions may be stored in the database server 106 as a modified second set of portions. Further, if the response received as "no," the data validation task may be modified in either data editing task or data entry task. In an embodiment, the response for the data editing task may be received in the form of the one or more characters that has been edited by the crowdworker, in the third set of portions. Further, the third set of portions may be stored in the database server 106 as a modified third set of portions. Similarly, the response for the data entry task may be received in the form of the one or more characters that has been entered by the crowdworker, in the fourth set of portions. Further, the fourth set of portions may be stored in the database server 106 as a modified fourth set of portions. A person having ordinary skills in the art will understand that the response for each of the one or more tasks may be provided in the respective set of portions and the modified set of portions are stored in the database server 106 along with the location identification code, for later retrieval.

At step 324, a digitized electronic document is generated based on the response received from each of the one or more crowdworkers. The processor 202 may be configured to extract one or more modified portions from the modified set of portions, from the database server 106. In an embodiment, the modified second set of portions, the modified third set of portions, and the modified fourth set of portions may collectively form a modified set of portions. After extraction, each of the one or more modified portions of the modified set of portions may be arranged in a new electronic document, in accordance with their location identification code. For example, two modified portions along with their location identification codes $(x_1, y_1)A$ and $(x_2, y_2)A$ are extracted from the database server 106. After extraction these two modified portions will be arranged in the new electronic document at the same position as they were previously arranged in the electronic document "A." Hence, a digitized document (i.e., new electronic document) is generated for the electronic document "A" that include the modified portions at same position as they were previously arranged in the electronic document "A." Further, the digitized electronic document may be stored in the database server 106. Control passes to end step 326.

Figure 4:
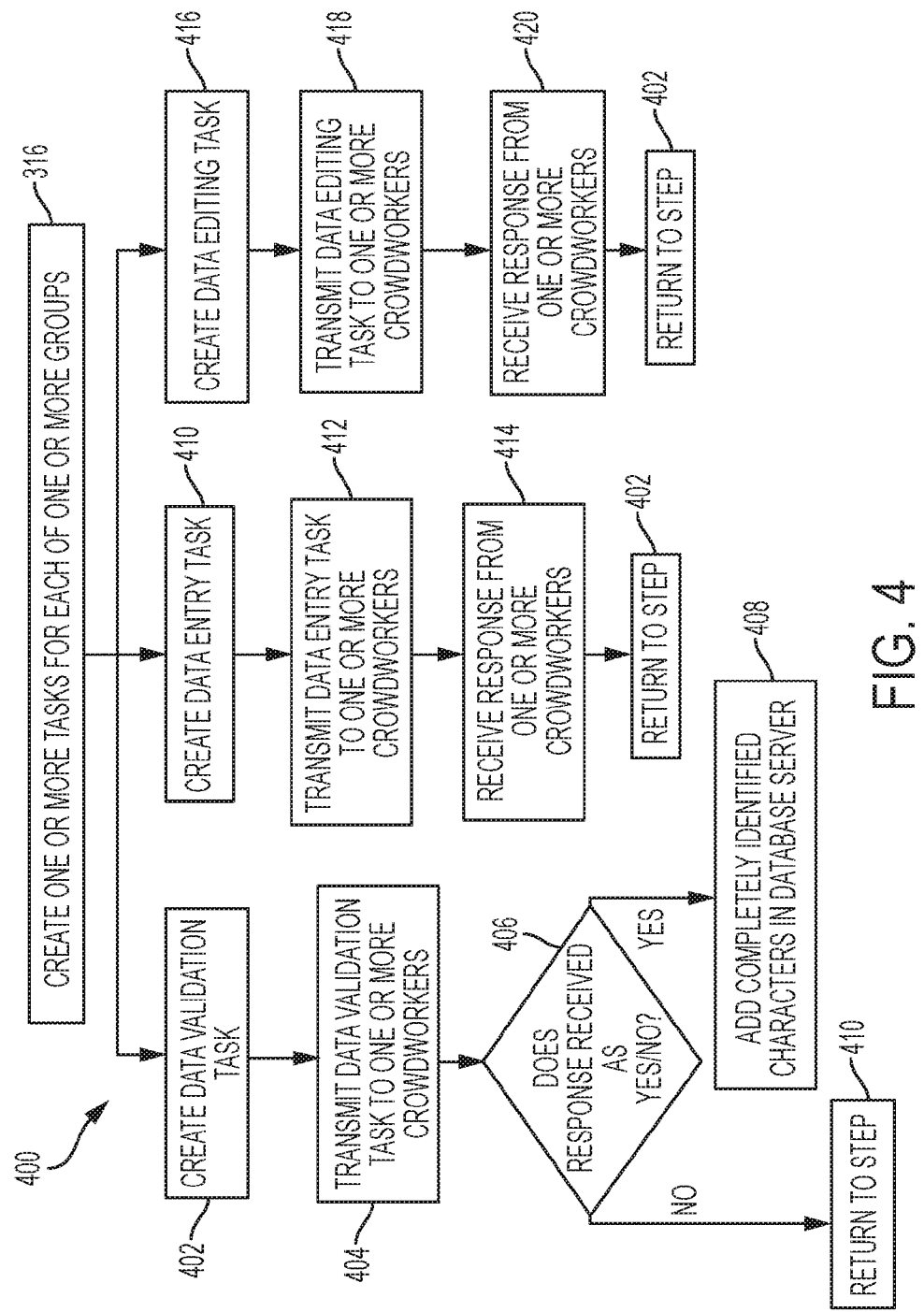
FIG. 4 is a flowchart that illustrates a method of creation of workflow of one or more tasks, in accordance with at least one embodiment.

FIG. 4 illustrates a flowchart 400 of a method of creation of workflow of the one or more tasks, in accordance with at least one embodiment. The flowchart 400 is described in conjunction with FIGS. 1-3. The method starts in continuation of step 316 and proceed to step 402.

At step 402, a data validation task may be created as described above (step 316). The data validation task may be transmitted to the one or more crowdworkers, at step 404. In an embodiment, the task assignment unit 216 may be configured to publish the data validation task at the crowdsourcing platform hosted on the crowdsourcing platform server 104. The one or more crowdworkers associated with the computing device 102 may receive the data validation task from the crowdsourcing platform. After receiving the data validation task, the one or more crowdworkers may execute the data validation task. The transceiver 204 may receive the response from the one or more crowdworkers, after execution of the data validation task. The data validation task may ask the one or more crowdworkers to validate whether the content in the second set of portions match with the one or more characters, completely identified based on the OCR technique. At step 406, the transceiver 204 may receive the response for the data validation task, from the one or more crowdworkers as either "yes" or "no." If the received response is "yes," step 408 may be performed. If step 406 shows that the received response is "no," step 416 may be performed. The response "yes" indicates that the content in the second set of portions match with the one or more characters, completely identified based on the OCR technique, and the response "no" indicates that the content in the second set of portions fails to match with the one or more characters, completely identified based on the OCR technique.

At step 408, the one or more characters that completely identified based on OCR technique, may be added in the database server 106. In an embodiment, the database server 106 may be configured to receive the response provided by the one or more crowdworkers for the data validation task, through the application server 108, to store for later retrieval.

At step 410, a data entry task may be created as described above (step 316). After receiving the response as "no," the one or more characters that completely identified based on the OCR technique may be dropped and the data validation task may be modified into the data entry task. The task modification unit 218 may be configured to modify the data validation task into the data entry task. In certain scenario, after receiving the response as "no," the one or more crowdworkers may be asked to identify a set of characters from the one or more characters that do not match with the content in the second set of portions. In such scenarios, the set of characters from the one or more characters will be dropped only, and the other one or more characters that match with the content in the second set of portions will be added in the database server 106. Therefore, in such scenarios, the data validation task will be modified into the data editing task.

At step 412, the data entry task may be transmitted to the one or more crowdworkers. In an embodiment, the task assignment unit 216 may be configured to publish the data entry task at the crowdsourcing platform by using the crowdsourcing platform server 104. The one or more crowdworkers associated with the computing device 102 may receive the data entry task from the crowdsourcing platform. In an embodiment, the one or more crowdworkers selected for processing the data entry tasks are different from the one or more crowdworkers that have previously processed the data validation task. After receiving the data entry task, the one or more crowdworkers may execute the data entry task. The transceiver 204 may receive the response from the one or more crowdworkers, after execution of the data entry task. The data entry task may ask the one or more crowdworkers to enter the content in the fourth set of portions, as the identification of the one or more characters based on the OCR technique has failed.

At step 414, the transceiver 204 may receive the response for the data entry task, from the one or more crowdworkers. In an embodiment, the one or more crowdworkers may enter the content in the fourth set of portions. After completion of the data entry task, step 402 may be performed to validate the response provided by the one or more crowdworkers for the data entry task. Hence, the data entry task may be modified into the data validation task based on the response provided by the one or more crowdworkers.

Similarly, at step 416, the data editing task may be created as described above (step 316). At step 418, the data editing task may be transmitted to the one or more crowdworkers. In an embodiment, the task assignment unit 216 may be configured to publish the data editing task at the crowdsourcing platform hosted on the crowdsourcing platform server 104. The one or more crowdworkers associated with the computing device 102 may receive the data editing task from the crowdsourcing platform. After receiving the data editing task, the one or more crowdworkers may execute the data editing task. The transceiver 204 may receive the response from the one or more crowdworkers, after execution of the data editing task. The data editing task may ask the one or more crowdworkers to edit the content in the third set of portions, as the identification of the one or more characters based on the OCR technique is partial.

At step 420, the transceiver 204 may receive the response for the data editing task, from the one or more crowdworkers. In an embodiment, the one or more crowdworkers may edit the content in the third set of portions. After completion of the data editing task, step 402 may be performed to validate the response provided by the one or more crowdworkers for the data editing task. Hence, the data editing task may be modified into the data validation task based on the response provided by the one or more crowdworkers.

Figure 5A:
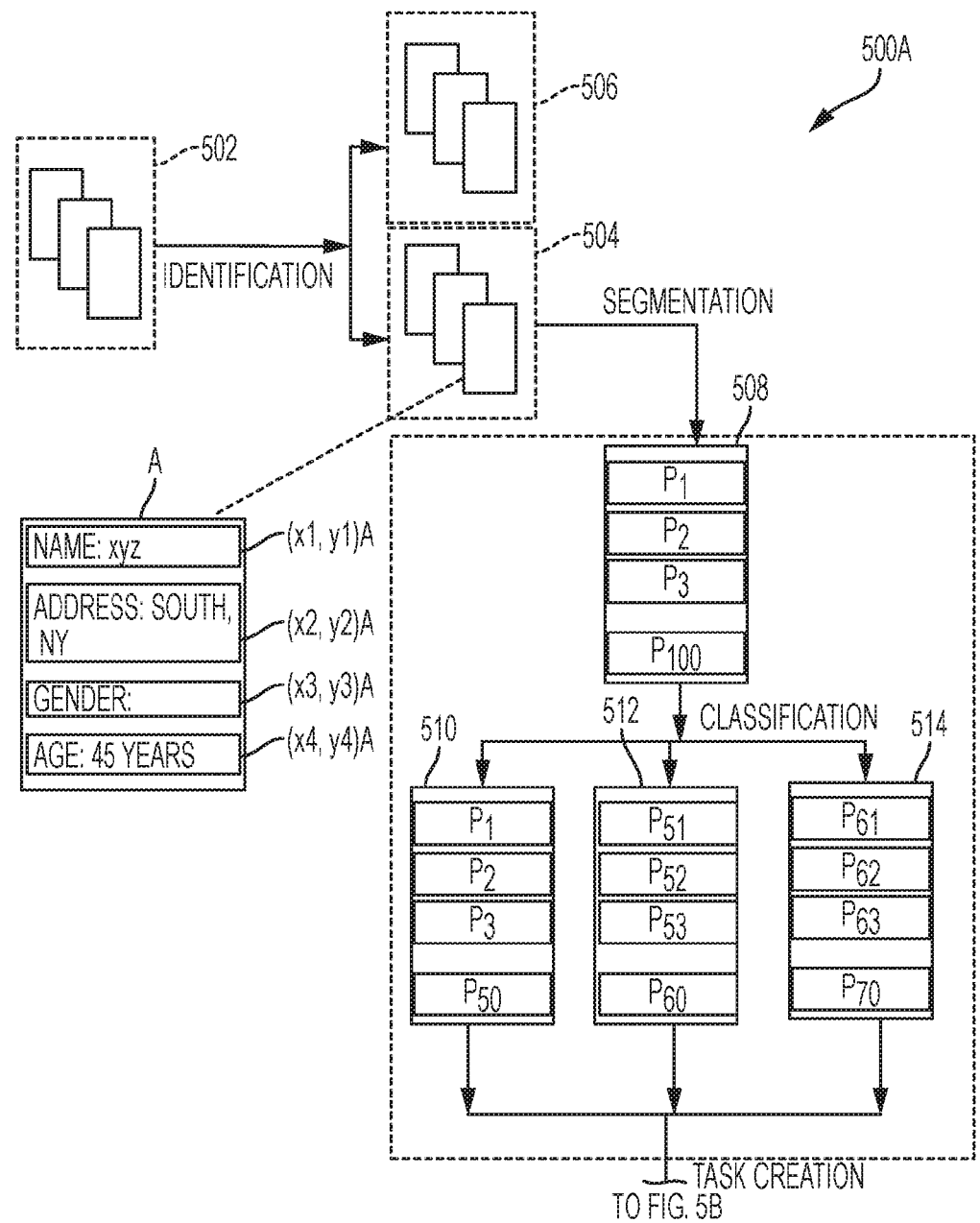
FIGS. 5A and 5B are block diagrams that illustrates an exemplary scenario for digitization of a document, in accordance with at least one embodiment.
Figure 5B:
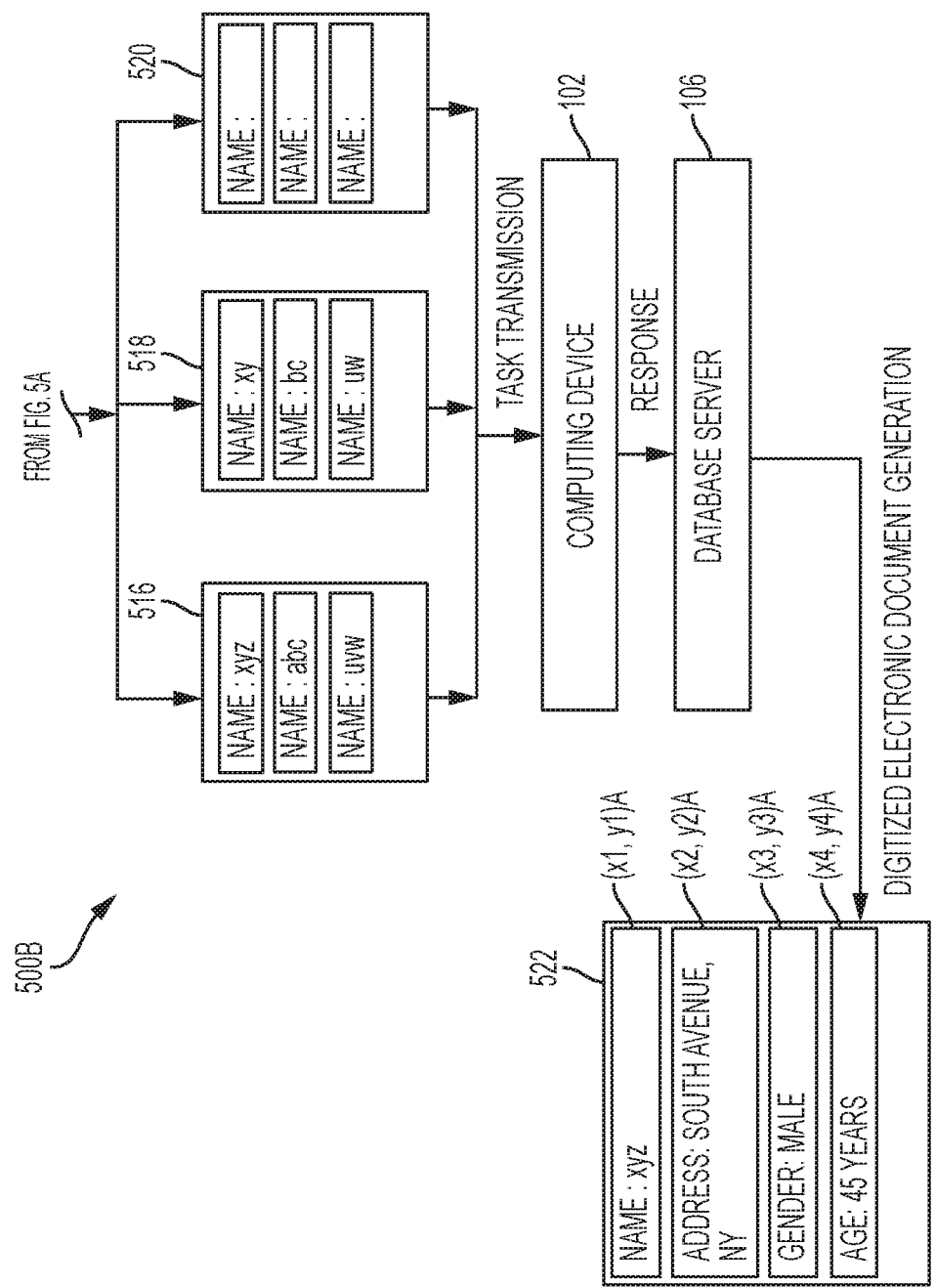

FIGS. 5A and 5B are block diagrams (500A and 500B, respectively) that illustrates an exemplary scenario for cost-effective crowdsourcing of the one or more tasks, in accordance with at least one embodiment. FIGS. 5A and 5B are explained in conjunction with the FIGS. 1-4. The block diagram 500A and 500B represents a plurality of electronic documents 502, a first set of electronic documents 504, a second set of electronic documents 506, an electronic document 508, a first group 510, a second group 512, a third group 514, a data validation task 516, a data editing task 518, a data entry task 520, a digitized electronic document 522, the computing device 102, and the database server 106.

In an exemplary scenario, the plurality of electronic documents 502 may be generated based on scanning of the plurality of documents, by the application server 108. Examples of the plurality of documents may include, but are not limited to, an insurance form that include one or more fields, such as, "name," "address," "age," and the like of a policy holder. The one or more fields of the insurance form may be filled with one or more characters provided by the policy holder. For example, the "name" field may be filled as "abc" in the insurance form that may be the name of the policy holder. Further, the insurance form may include another "name" field that may correspond to the name of a nominee of the policy holder and, so forth. In an embodiment, the plurality of electronic documents 502 may be retrieved from the database server 106, if the plurality of electronic documents 502 are generated by the multi-functional device 112. In an embodiment, the database server 106 may be configured to maintain the repository of the plurality of electronic documents 502. After scanning, the plurality of electronic documents 502 may be stored in the database server 106. Each of the plurality of electronic documents that are stored in the database server 106, may be associated with the identification code, such as "A," "B," "C," and the like.

In an embodiment, the processor 202 in conjunction with the transceiver 204 may be configured to retrieve the plurality of electronic documents 502, from the database server 106. Further, the identification unit 210 may compare the plurality of electronic documents 502 with the pre-defined template, such as an insurance form. The pre-defined template may include the one or more fields, such as, "policy number," "name," "age," "address," "contact number," and the like of a policy holder. Based on the comparison, the identification unit 210 may identify the first set of electronic documents 504 and the second set of electronic documents 506. It may identified that the first set of electronic documents 504 matches with the pre-defined template (i.e., include the one or more fields as defined in the pre-defined template) and the second set of electronic documents 506 fails to match with the pre-defined template (i.e., fails to include the one or more fields as defined in the pre-defined template). The first set of electronic documents 504 may be selected for further processing, and the second set of electronic documents 506 may be discarded. Therefore, the cost of digitization of the second set of electronic documents 506 may be saved.

Further, the first set of electronic documents 504 may be processed for digitization. Table 6 provided below illustrates the selection of the first set of electronic documents 504.

TABLE 6

Illustration of selection of the first set of electronic documents.

No. of electronic documents = 50
No. of electronic documents in first set of electronic documents = 35
No. of electronic documents in second set of electronic documents = 15
No. of electronic documents processed for digitization = 35

It will be apparent to a person having ordinary skills in the art that the above Table 6 has been provided only for illustration purposes and should not limit the scope of the invention to these number of the plurality of electronic documents 502 only. For example, listed number of the plurality of electronic documents 502, number of the first set of electronic documents 504, and number of the second set of electronic documents 506 included in Table 6 may be different from depicted number of the plurality of electronic documents 502, number of the first set of electronic documents 504, and number of the second set of electronic documents 506. From Table 6, it may be observed that the cost of digitization of "15" electronic documents may be saved.

In an embodiment, the identification unit 210 may be configured to select the electronic document 508, from the first set of electronic documents 504. For example, the electronic document 508 may be associated with the identification code "A." In an embodiment, the electronic document 508 may include one or more portions ($P_1$-$P_{100}$). Each of the one or more portions ($P_1$-$P_{100}$) may be associated with a location identification code, such as, "($x_1$, $y_1$)A-($x_{100}$, $y_{100}$)A," respectively. For example, the electronic document 508 associated with identification code "A" has four portions, such as, "($x_1$, $y_1$)A," "($x_2$, $y_2$)A," "($x_3$, $y_3$)A," and "($x_4$, $y_4$)A." Each of the four portions may include a field and corresponding one or more characters. For example, the portion "($x_1$, $y_1$)A" may include "name" field with corresponding one or more characters, such as, "abc" that has been filled by the policy holder. A person skilled in the art may understand that the one or more characters filled in each portion of the one or more portions of the electronic document 508, may not be filled correctly. Hence, the electronic document 508 need to be digitized by the one or more crowdworkers.

In one scenario, the electronic document 508 may include the one or more portions ($P_1$-$P_{100}$) with different quality score. In an embodiment, the segmentation unit 208 may be configured to assign the quality score to each of the one or more portions ($P_1$-$P_{100}$) based on the presence of pre-defined marking, and the presence of content. Further, it may be identified that the first set of portions ($P_1$-$P_{70}$) of the one or more portions ($P_1$-$P_{100}$) have a quality score greater than the first pre-defined threshold score and the other set of portions ($P_{71}$-$P_{100}$) have a quality score less than the first pre-defined threshold score.

As discussed above that the quality score assigned to the one or more portions ($P_1$-$P_{100}$) is depend on the presence of the content in the respective one or more portions ($P_1$-$P_{100}$). Therefore, a high quality score may be assigned to the first set of portions ($P_1$-$P_{70}$) of the one or more portions ($P_1$-$P_{100}$) as the first set of portions ($P_1$-$P_{70}$) comprise the content. Further, a low quality score may be assigned to the other set of portions ($P_{71}$-$P_{100}$) of the one or more portions ($P_1$-$P_{100}$) as the other set of portions ($P_{71}$-$P_{100}$) may not comprise content. Hence, the first set of portions ($P_1$-$P_{70}$) may be selected from the one or more portions ($P_1$-$P_{100}$), and the other set of portions ($P_{71}$-$P_{100}$) may be discarded. Further, the processor 202 may be configured to process, only the first set of portions ($P_1$-$P_{70}$) for digitization and discard the other set of portions ($P_{71}$-$P_{100}$) from processing. Therefore, the cost of digitization of the other set of portions ($P_{71}$-$P_{100}$) may be saved. Table 7 provided below illustrates the selection of the first set of portions ($P_1$-$P_{70}$).

TABLE 7

Illustration of selection of the first set of portions (P1-P70)

No. of portions in one or more of portions ($P_1$-$P_{100}$) = 100
No. of portions in first set of portions ($P_1$-$P_{70}$) = 70
No. of portions in other set of portions ($P_{71}$-$P_{100}$) = 30
No. of portions processed for digitization ($P_1$-$P_{70}$) = 70

It will be apparent to a person having ordinary skills in the art that the above Table 7 has been provided only for illustration purposes and should not limit the scope of the invention to these number of the one or more portions ($P_1$-$P_{100}$) only. For example, listed number of the one or more portions ($P_1$-$P_{100}$), number of the first set of portions ($P_1$-$P_{70}$), and number of the other set of portions ($P_{71}$-$P_{100}$) included in Table 7 may be different from the depicted number of the one or more portions ($P_1$-$P_{100}$), number of the first set of portions ($P_1$-$P_{70}$), and number of the other set of portions ($P_{71}$-$P_{100}$). From Table 7, it may be observed that the cost of digitization of "30" other set of portions ($P_{71}$-$P_{100}$) are saved.

In an embodiment, the one or more characters in the first set of portions ($P_1$-$P_{70}$) of the electronic document 508 may be identified based on the OCR technique. The one or more characters in the first set of portions ($P_1$-$P_{70}$) may be either completely identified, partially identified, or fail to be identified, by the OCR technique. Further, based on the status of identification of the one or more characters, each portion in the first set of portions ($P_1$-$P_{70}$) may be classified in the one or more groups. In an embodiment, the classification unit 212 may be configured to classify each portion of the first set of portions ($P_1$-$P_{70}$), in the first group 510, the second group 512, and the third group 514. In an embodiment, the first group 510 comprise a second set of portions ($P_1$-$P_{50}$) from the first set of portions ($P_1$-$P_{70}$) where the one or more characters are completely identified. Further, the second group 512 comprise a third set of portions ($P_{51}$-$P_{60}$) from the first set of portions ($P_1$-$P_{70}$) where the one or more characters are partially identified, and the third group 514 comprise a fourth set of portions ($P_{61}$-$P_{70}$) from the first set of portions ($P_1$-$P_{70}$) where the identification of the one or more characters has failed. Table 8 provided below illustrates the classification of the one or more groups.

TABLE 8

Illustration of the classification of the one or more groups.

| Portions | Status of identification | Classification |
|---|---|---|
| Second set of portions ($P_1$-$P_{50}$) | Complete | First group |
| Third set of portions ($P_{51}$-$P_{60}$) | Partial | Second group |
| Fourth set of portions ($P_{61}$-$P_{70}$) | Fail | Third group |

It will be apparent to a person having ordinary skills in the art that the above Table 8 has been provided only for illustration purposes and should not limit the scope of the invention to the classification of the one or more groups form the second set of portions ($P_1$-$P_{50}$), the third set of portions ($P_{51}$-$P_{60}$), and the fourth set of portions ($P_{61}$-$P_{70}$) only. For example, the listed second set of portions ($P_1$-$P_{50}$), the third set of portions ($P_{51}$-$P_{60}$), and the fourth set of portions ($P_{61}$-$P_{70}$) included in Table 8 may be different from depicted number of the second set of portions ($P_1$-$P_{50}$), the third set of portions ($P_{51}$-$P_{60}$), and the fourth set of portions ($P_{61}$-$P_{70}$).

Subsequently, the task creation unit 214 may be configured to create the one or more tasks for each of the one or more groups. Further, the data validation task 516, the data editing task 518, and the data entry task 520 may be created for each of the first group 510, the second group 512, and the third group 514, respectively. In an embodiment, the data validation task 516 may be created for the first group 510, the data editing task 518 may be created for the second group 512, and the data entry task 520 may be created for the third group 514.

In an embodiment, the task creation unit 214 may further be configured to create the one or more tasks for each of the one or more groups, in such a way that each of the one or more tasks may include portion of a same field. For example, the first group 510 include the second set of portions ($P_1$-$P_{50}$). The second set of portions may include the one or more fields, such as, "name," "address," "gender," and "age," and the like. Further, the task creation unit 214 may be configured to create the data validation task 516 such that, it comprises portion of the "name" field extracted from the second set of portions ($P_1$-$P_{50}$). Similarly, another data validation task 516 may be created that includes portion of the "age" field extracted from the second set of portions ($P_1$-$P_{50}$). In a similar way, the data editing task 518 and the data entry task 520 may be created. The following Table 9 illustrates an example of the one or more tasks created for each of the one or more groups:

TABLE 9

Illustration of creation of the one or more tasks.

| | | One or more portions | |
|---|---|---|---|
| Task | Groups | One or more fields | One or more characters |
| Data validation task | First group | Name | abc |
| | | Name | xyz |
| | | Name | uvw |
| Data editing task | Second group | Name | bc |
| | | Name | xy |
| | | Name | uv |
| Data entry task | Third group | Name | |
| | | Name | |
| | | Name | |

It will be apparent to a person having ordinary skills in the art that the above Table 9 has been provided only for illustration purposes and should not limit the scope of the invention to the one or more portions (i.e., "name" field) included in the data validation task 516, the data editing task 518, and the data entry task 520, only. For example, listed one or more portions (i.e., "name" field) included in the data validation task 516, the data editing task 518, and the data entry task 520, in the table-9, may be different from depicted one or more portions. For example, in Table 9, the data validation task 516 is created based on "name" field of the second set of portions, but the data validation task 516 may be created with "address" field of the second set of portions, and, so forth. Further, the data validation task 516 may include "name" field from the second set of portions of each electronic document of the first set of electronic documents, such as, the electronic document "A," the electronic document "B," the electronic document "C" and the like.

The advantage of such creation of the data validation task 516, the data editing task 518, and the data entry task 520, is to improve the efficiency of the one or more crowdworkers and to reduce the execution time of the data validation task 516, the data editing task 518, and the data entry task 520. Therefore, the cost of digitization of the data validation task 516, the data editing task 518, and the data entry task 520 may be saved.

In an embodiment, each of the data validation task 516, the data editing task 518, and the data entry task 520 are associated with a cost. In an embodiment, the cost of digitization of the data validation task 516 is less than the cost of digitization of the data editing task 518, and the cost of digitization of the data editing task 518 is less than the cost of digitization of the data entry task 520.

In an embodiment, the data validation task 516, the data editing task 518, and the data entry task 520 may be transmitted to the one or more crowdworkers through the crowdsourcing platform server 104. The crowdsourcing platform hosted on the crowdsourcing platform server 104 may be configured to publish the data validation task 516, the data editing task 518, and the data entry task 520. In an embodiment, the data validation task 516, the data editing task 518, and the data entry task 520 may be transmitted in accordance with a pre-defined workflow. Further, the one or more crowdworkers may execute the one or more tasks, received from the crowdsourcing platform and provide their responses for the respective task. Example workflow of the data validation task 516, the data editing task 518, and the data entry task 520 have been described later in conjunction with FIGS. 6A, 6B and 6C.

Each of the one or more crowdworkers may receive the one or more tasks through the computing device 102. A response for each of the one or more tasks is received from each of the one or more crowdworkers. The response received for one type of task may be different from the response received for other type of the task. For example, the response for data validation task 516 may be received in the form of "yes" or "no." After receiving the response as "yes," the one or more characters that are completely identified by OCR technique are retained in the second set of portions. Further, the second set of portions may be stored in the database server 106 as a modified second set of portions ($P'_1$-$P'_{50}$). Further, if the response received as "no," the data validation task 516 may be modified in either data editing task 518 or data entry task 520. In an embodiment, the response for the data editing task 518 may be received in the form of the one or more characters that has been edited by the crowdworker, in the third set of portions. Further, the third set of portions ($P_{51}$-$P_{60}$) may be stored in the database server 106 as a modified third set of portions ($P'_{51}$-$P'_{60}$). Similarly, the response for the data entry task 520 may be received in the form of the one or more characters that has been entered by the crowdworker, in the fourth set of portions. Further, the fourth set of portions ($P_{61}$-$P_{70}$) may be stored in the database server 106 as a modified fourth set of portions ($P'_{61}$-$P'_{70}$). A person having ordinary skills in the art will understand that the response for each of the one or more tasks may be provided in the respective set of portions, and the modified set of portions are stored in the database server 106 along with the location identification code, for later retrieval.

Subsequently, a digitized electronic document 522 may be generated based on the response received from each of the one or more crowdworkers. Further, two modified portions, such as, $P'_1$ and $P'_2$ along with their location identification codes ($x_1$, $y_1$)A and ($x_2$, $y_2$)A are extracted from the modified set of portions ($P'_1$-$P'_{70}$), from the database server 106. In an embodiment, the modified second set of portions ($P'_1$-$P'_{50}$), the modified third set of portions ($P'_{51}$-$P'_{60}$), and the modified fourth set of portions ($P'_{61}$-$P'_{70}$), may collectively form a modified set of portions ($P'_1$-$P'_{70}$). After extraction, these two modified portions ($P'_1$ and $P'_2$) will be arranged in the new electronic document at same position as they were previously arranged in the electronic document "A." Hence, the digitized electronic document 522 is generated with modified portions ($P'_1$ and $P'_2$). Further, the digitized electronic document 522 may be stored in the database server 106.

Figure 6A:
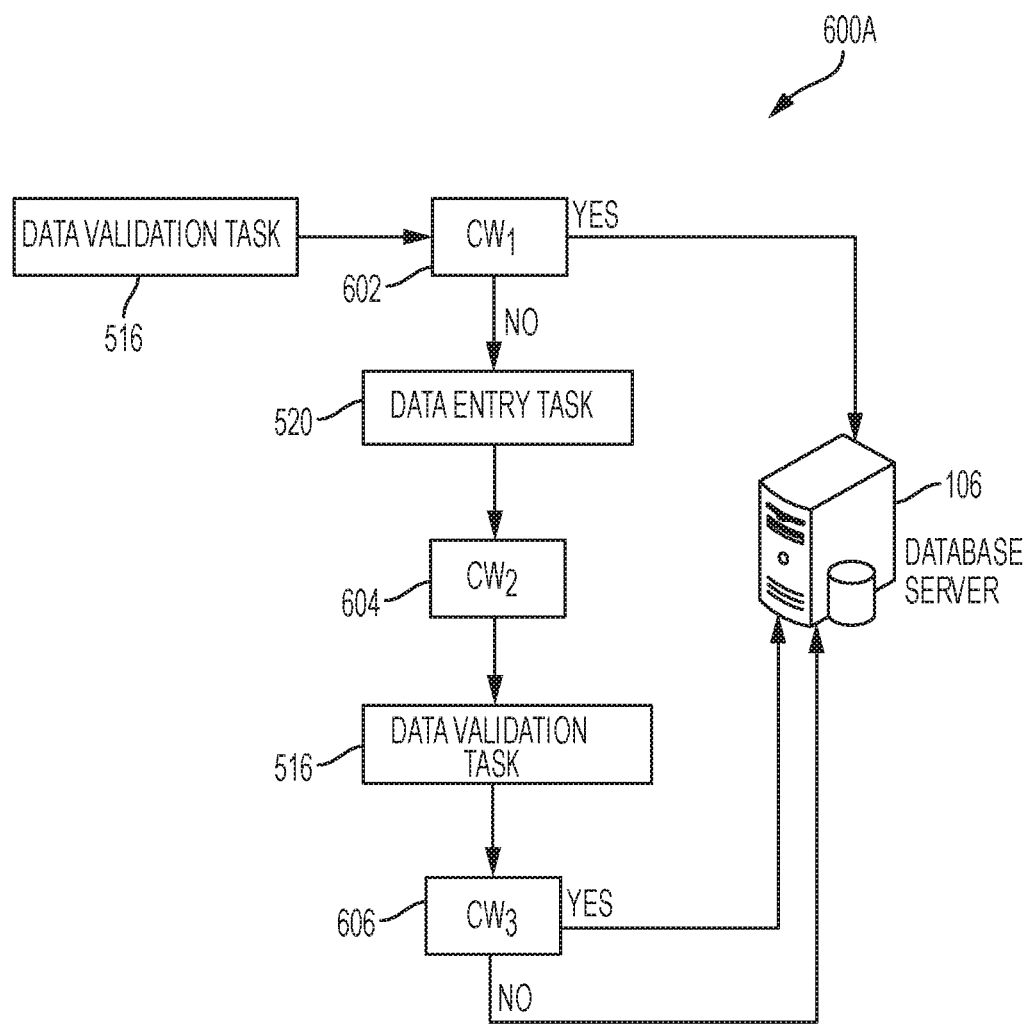
FIGS. 6A, 6B, and 6C are block diagrams that illustrate an exemplary scenario for a method of creation of workflow of the one or more tasks, in accordance with at least one embodiment.
Figure 6B:
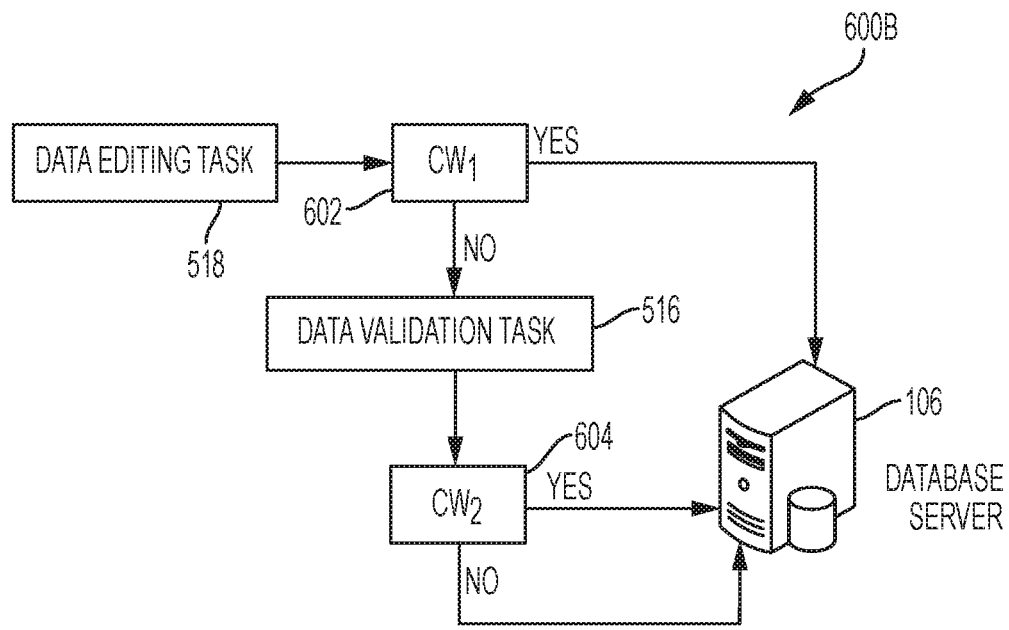
Figure 6C:
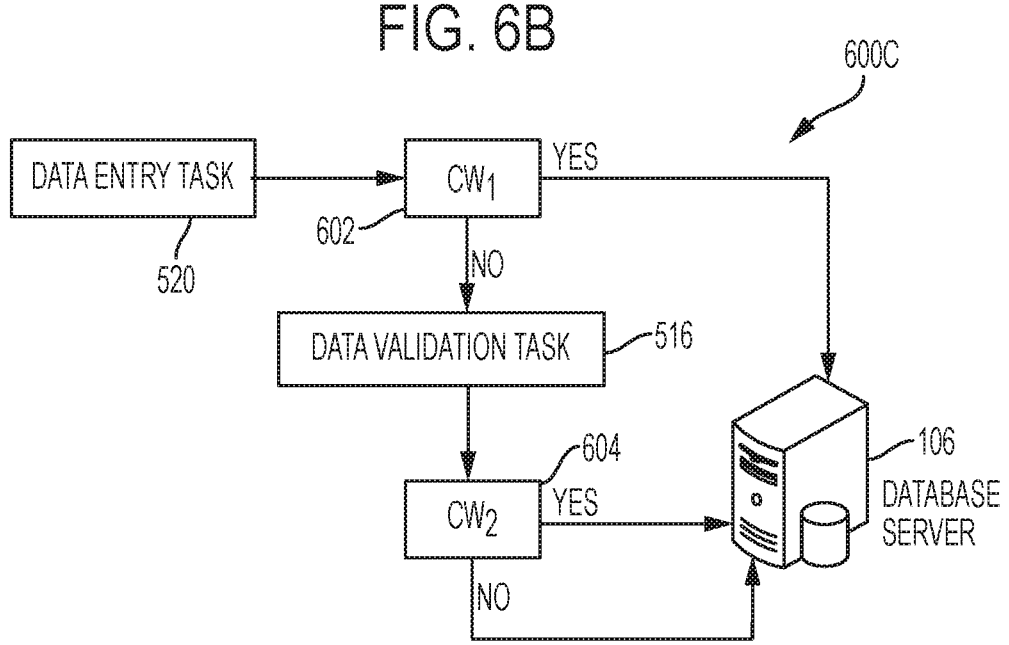

FIGS. 6A, 6B, and 6C are block diagrams (600A, 600B, and 600C, respectively) that illustrate an exemplary scenario for a method of creation of workflow of the one or more tasks, in accordance with at least one embodiment. The FIGS. 6A, 6B, and 6C are described in conjunction with FIGS. 1-5. FIGS. 6A, 6B, and 6C represent a first crowdworker ($CW_1$) 602, a second crowdworker ($CW_2$) 604, a third crowdworker ($CW_3$) 606, the data validation task 516, the data editing task 518, the data entry task 520, and the database server 106.

In FIG. 6A, the data validation task 516 may be transmitted to the first crowdworker ($CW_1$) 602 through the crowdsourcing platform. The computing device 102 associated with the first crowdworker ($CW_1$) 602 may receive the data validation task 516. The first crowdworker ($CW_1$) 602 may be asked to validate whether the content in the second set of portions ($P_1$-$P_{50}$) match with the one or more characters, completely identified based on the OCR technique. If the response provided by the first crowdworker ($CW_1$) 602 is "yes," the one or more characters that completely identified based on OCR technique, may be added in the database server 106. If the response provided by the first crowdworker ($CW_1$) 602 is "no," the one or more characters that completely identified based on the OCR technique may be dropped and the data validation task 516 may be modified into the data entry task 520. In certain scenario, after receiving the response as "no," for the data validation task 516, the first crowdworker ($CW_1$) 602 may be asked to identify a set of characters from the one or more characters that do not match with the content in the second set of portions ($P_1$-$P_{50}$). In such scenarios, the set of characters from the one or more characters will be dropped only, and the other one or more characters that match with the content in the second set of portions ($P_1$-$P_{50}$) will be added in the database server 106. Therefore, in such scenarios, the data validation task 516 will be modified into the data editing task 518.

Further, the data entry task 520 may be transmitted to the second crowdworker ($CW_2$) 604. The computing device 102 associated with the second crowdworker ($CW_2$) 602 may receive the data entry task 520. The second crowdworker ($CW_2$) 604 may be asked to enter the content in the fourth set of portions ($P_{61}$-$P_{70}$), as the identification of the one or more characters based on the OCR technique has failed. After completion of the data entry task 520 by the second crowdworker ($CW_2$) 604, the data entry task 520 may be modified into data validation task 516. Now, the third crowdworker ($CW_3$) 606 may be asked to validate the data entered by the second crowdworker ($CW_2$) 604. If the response provided by the third crowdworker ($CW_3$) 606 is "yes," the one or more characters that completely identified based on OCR technique, may be added in the database server 106. If the response provided by the third crowdworker (CW$_3$) 606 is "no," the fourth set of portions (P$_{61}$-P$_{70}$) may be retained blank and added in the database server 106.

In FIG. 6B, the data editing task 518 may be transmitted to the first crowdworker (CW$_1$) 602 through the crowdsourcing platform. The computing device 102 associated with the first crowdworker (CW$_1$) 602 may receive the data editing task 518. The first crowdworker (CW$_1$) 602 may be asked to edit the content in the third set of portions (P$_{51}$-P$_{60}$), as the identification of the one or more characters based on the OCR technique is partial. After completion of the data editing task 518 by the first crowdworker (CW$_1$) 602, the data editing task 518 may be modified into the data validation task 516. Now, the second crowdworker (CW$_2$) 604 may be asked to validate the data edited by the first crowdworker (CW$_1$) 602. If the response provided by the second crowdworker (CW$_2$) 604 is "yes," the one or more characters that completely identified based on OCR technique, may be added in the database server 106. If the response provided by the second crowdworker (CW$_2$) 604 is "no," the third set of portions (P$_{51}$-P$_{60}$) may be retained blank and added in the database server 106.

In FIG. 6C, the data entry task 520 may be transmitted to the first crowdworker (CW$_1$) 602 through the crowdsourcing platform. The computing device 102 associated with the first crowdworker (CW$_1$) 602 may receive the data entry task 520. The first crowdworker (CW$_1$) 602 may be asked to enter the content in the fourth set of portions (P$_{61}$-P$_{70}$), as the identification of the one or more characters based on the OCR technique has failed. After completion of the data entry task 520 by the first crowdworker (CW$_1$) 602, the data entry task 520 may be modified into the data validation task 516. Now, the second crowdworker (CW$_2$) 606 may be asked to validate the data entered by the first crowdworker (CW$_1$) 602. If the response provided by the second crowdworker (CW$_2$) 604 is "yes," the one or more characters that completely identified based on OCR technique, may be added in the database server 106. If the response provided by the second crowdworker (CW$_2$) 604 is "no," the fourth set of portions (P$_{61}$-P$_{70}$) may be retained blank and added in the database server 106.

Figure 7:
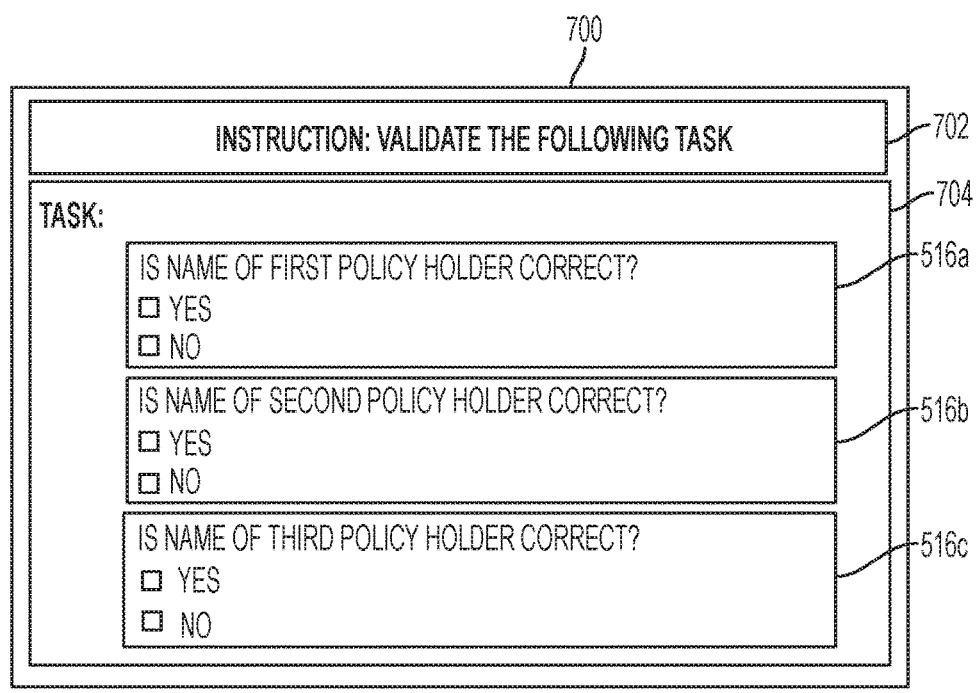
FIG. 7 is a user interface that illustrates a task populated at the display screen of the computing device, in accordance with at least one embodiment.

FIG. 7 is a user interface 700 that illustrates a task populated at the display screen of the computing device 102, in accordance with at least one embodiment. FIG. 7 is described in conjunction with FIGS. 1-6. FIG. 7 represents the user interface 700, an instruction field 702, and a task field 704.

In an embodiment, the computing device 102 associated with the first crowdworker (CW$_1$) 602 may receive the task. The user interface 700, displayed on the display screen of the computing device 102 may be populated with the instruction field 702 and the task field 704. The instruction field 702 comprises an instruction for the first crowdworker (CW$_1$) 602 to execute the task. The task field 704 comprises a first data validation task 516a, a second data validation task 516b, and a third data validation task 516c. In an embodiment, the task creation unit 214 have populated the task on the user interface 700 in such a manner that the display screen of the computing device 102 is optimized. Hence, the key usage (i.e., use of mouse) required for page scrolling (i.e., page up or page down) during the execution of the task is reduced and the task is executed with the help of keyboard strokes only. Therefore, the first crowdworker (CW$_1$) 602 may execute the first data validation task 516a, the second data validation task 516b, and the third data validation task 516c with the help of keyboard strokes only. The advantage of reduction of key usage during execution of the task is to improve the productivity of the first crowdworker (CW$_1$) 602 and save the cost of the digitization task.

The disclosed embodiments encompass numerous advantages. Various embodiments of the disclosure lead to a method and a system for digitization of a document. Through various embodiments of the disclosure, the one or more tasks are created in such a manner that the cost of digitization is saved. Further, the one or more tasks are transmitted to the one or more crowdworkers in a cost-effective manner without compromising the quality of the digitization of the one or more tasks. Therefore, it is advantageous to digitize a document in a cost-effective manner.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described may also be implemented using only software programming or using only hardware or by a varying combination of the two techniques. The disclosure is independent of the programming language and the operating system used in the computers. The instructions for the disclosure may be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure may also be implemented in various operating systems and platforms including, but not limited to, 'Unix', 'DOS', 'Android', 'Symbian', and 'Linux'.

The programmable instructions may be stored and transmitted on a computer-readable medium. The disclosure may also be embodied in a computer program product comprising a computer-readable medium, or with any product capable of implementing the above methods and systems, or the numerous possible variations thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Various embodiments of the methods and systems for cost-effective digitization of a document have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims may encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for digitization of a document, the method comprising:
    scanning, by one or more processors, the document to generate an electronic document;
    segmenting, by the one or more processors, the electronic document into one or more portions;
    selecting, by the one or more processors, a first set of portions from the one or more portions of the electronic document based on at least a quality score associated with each of the one or more portions,
        wherein the quality score is assigned to each of the one or more portions based on a presence of pre-defined markings in the one or more portions and a presence of content in each of the one or more portions, and
        wherein the quality score is indicative of the quality of scanning of the one or more portions;
    identifying, by the one or more processors, one or more characters in the first set of portions of the electronic document based on a character recognition technique;
    classifying, by the one or more processors, each portion in the first set of portions in one or more groups based on at least a status of identification that indicates a quality of the one or more characters identified using the character recognition technique;
    creating, by the one or more processors, one or more tasks for each of the one or more groups,
        wherein a type of the one or more tasks created for a group of the one or more groups corresponds to the quality of the one or more characters and is different from the type of the one or more tasks created for other group of the one or more groups,
        wherein each type of the one or more tasks is associated with a cost, and
        wherein the cost of one type of the one or more tasks is different from the cost of other type of the one or more tasks;
    transmitting, by the one or more processors, the one or more tasks to one or more crowdworkers based at least on the respective type of the one or more tasks;
    receiving, by the one or more processors, a response for each of the one or more tasks from each of the one or more crowdworkers; and
    generating, by the one or more processors, a digitized electronic document based on the response received for each of the one or more tasks.

2. The method of claim 1, further comprising identifying, by the one or more processors, the electronic document as a first set of electronic documents and/or a second set of electronic documents based on a pre-defined template, wherein the second set of electronic documents is discarded, wherein the cost of digitization of the second set of electronic documents is saved, and wherein the first set of electronic documents is digitized.

3. The method of claim 1, wherein the character recognition technique corresponds to an optical character recognition (OCR) technique, an intelligent character recognition (ICR) technique, and/or optical mark recognition (OMR) technique.

4. The method of claim 1, wherein the status of identification of the one or more characters comprises a complete identification of the one or more characters, a partial identification of the one or more characters, and a failed identification of the one or more characters, in each portion in the first set of portions.

5. The method of claim 1, wherein the one or more groups comprise a first group, a second group, and a third group, wherein the first group comprises a second set of portions from the first set of portions where the one or more characters are completely identified, wherein the second group comprises a third set of portions from the first set of portions where the one or more characters are partially identified, and wherein the third group comprises a fourth set of portions from the first set of portions where the identification of the one or more characters has failed.

6. The method of claim 5, wherein the one or more tasks created for the first group corresponds to a first type of task, wherein the one or more tasks created for the second group corresponds to a second type of task, and wherein the one or more tasks created for the third group corresponds to a third type of task.

7. The method of claim 6, wherein the first type of task corresponds to a data validation task, the second type of task corresponds to a data editing task, and the third type of task corresponds to a data entry task.

8. The method of claim 6, wherein a cost of digitization of the first type of task is less in comparison to the cost of digitization of the second type of task, and wherein the cost of digitization of the second type of task is less in comparison to the cost of digitization of the third type of task.

9. The method of claim 1, further comprising modifying, by the one or more processors, the type of the one or more tasks based on a response provided by each of the one or more crowdworkers for each of the one or more tasks.

10. A system for digitization of a document, the system comprising:
one or more processors configured to:
scan the document to generate an electronic document;
segment, by the one or more processors, the electronic document into one or more portions;
select a first set of portions from the one or more portions of the electronic document based on at least a quality score associated with each of the one or more portions, wherein the quality score is assigned to each of the one or more portions based on a presence of pre-defined markings in the one or more portions and a presence of content in each of the one or more portions, and wherein the quality score is indicative of the quality of scanning of the one or more portions;
identify one or more characters in the first set of portions of the electronic document based on a character recognition technique;
classify each portion in the first set of portions in one or more groups based on at least a status of identification that indicates a quality of the one or more characters identified using the character recognition technique;
create one or more tasks for each of the one or more groups,
wherein a type of the one or more tasks created for a group of the one or more groups corresponds to the quality of the one or more characters and is different from the type of the one or more tasks created for other group of the one or more groups,
wherein each type of the one or more tasks is associated with a cost, and
wherein the cost of one type of the one or more tasks is different from the cost of other type of the one or more tasks;
transmit the one or more tasks to one or more crowdworkers based at least on the respective type of the one or more tasks;
receive a response for each of the one or more tasks from the one or more crowdworkers; and
generate a digitized electronic document based on the response received for each of the one or more tasks.

11. The system of claim 10, wherein the one or more processors are further configured to identify the electronic document as a first set of electronic documents and/or a second set of electronic documents, based on a pre-defined template, wherein the second set of electronic documents is discarded, wherein the cost of digitization of the second set of electronic documents is saved, and wherein the first set of electronic documents is digitized.

12. The system of claim 10, wherein the status of identification of the one or more characters comprises a complete identification of the one or more characters, a partial identification of the one or more characters, and a failed identification of the one or more characters, in each portion in the first set of portions.

13. The system of claim 10, wherein the one or more groups correspond to a first group, a second group, and a third group, wherein the first group comprises a second set of portions from the first set of portions where the one or more characters are completely identified, wherein the second group comprises a third set of portions from the first set of portions where the one or more characters are partially identified, and wherein the third group comprises a fourth set of portions from the first set of portions where the identification of the one or more characters has failed.

14. The system of claim 13, wherein the one or more tasks created for the first group corresponds to a first type of task, wherein the one or more tasks created for the second group corresponds to a second type of task, and wherein the one or more tasks created for the third group corresponds to a third type of task.

15. The system of claim 14, wherein the first type of task corresponds to a data validation task, the second type of task corresponds to a data editing task, and the third type of task corresponds to a data entry task.

16. The system of claim 15, wherein a cost of digitization of the first type of task is less in comparison to the cost of digitization of the second type of task, and wherein the cost of digitization of the second type of task is less in comparison to the cost of digitization of the third type of task.

17. The system of claim 10, wherein the one or more processors are further configured to modify the type of the one or more tasks based on a response provided by the one or more crowdworkers for the one or more tasks and a validation of the response provided by the one or more crowdworkers for the one or more tasks.

18. A non-transitory computer-readable storage medium having stored thereon, a set of computer-executable instructions for causing a computer comprising one or more processors to perform steps comprising:
scanning a document to generate an electronic document;
segmenting, by the one or more processors, the electronic document into one or more portions;
selecting, by the one or more processors, a first set of portions from the one or more portions of the electronic document based on at least a quality score associated with each of the one or more portions,
wherein the quality score is assigned to each of the one or more portions based on a presence of pre-defined markings in the one or more portions and a presence of content in each of the one or more portions, and
wherein the quality score is indicative of the quality of scanning of the one or more portions;
identifying one or more characters in the first set of portions of an electronic document based on a character recognition technique;

classifying each portion in the first set of portions in one or more groups based on at least a status of identification that indicates a quality of the one or more characters identified using the character recognition technique;

creating one or more tasks for each of the one or more groups,
  wherein a type of the one or more tasks created for a group of the one or more groups corresponds to the quality of the one or more characters and is different from the type of the one or more tasks created for other group of the one or more groups,
  wherein each type of the one or more tasks is associated with a cost, and
  wherein the cost of one type of the one or more tasks is different from the cost of other type of the one or more tasks;

transmitting the one or more tasks to one or more crowdworkers based at least on the respective type of the one or more tasks;

receiving a response for each of the one or more tasks from the one or more crowdworkers; and generating a digitized electronic document based on the response received for each of the one or more tasks.

* * * * *